United States Patent
Whitehead

(10) Patent No.: US 10,054,687 B2
(45) Date of Patent: Aug. 21, 2018

(54) SYSTEM AND METHOD FOR DETECTING FALSE GLOBAL NAVIGATION SATELLITE SYSTEM SATELLITE SIGNALS

(71) Applicant: Hemisphere GNSS Inc., Scottsdale, AZ (US)

(72) Inventor: Michael L. Whitehead, Scottsdale, AZ (US)

(73) Assignee: Hemisphere GNSS Inc., Scottsdale, AZ (US)

(*) Notice: Subject to any disclaimer, the term of this patent is extended or adjusted under 35 U.S.C. 154(b) by 750 days.

(21) Appl. No.: 14/061,459

(22) Filed: Oct. 23, 2013

(65) Prior Publication Data
US 2015/0048973 A1 Feb. 19, 2015

Related U.S. Application Data

(60) Provisional application No. 61/865,935, filed on Aug. 14, 2013.

(51) Int. Cl.
*G01S 19/20* (2010.01)
*G01S 19/21* (2010.01)
*H04K 3/00* (2006.01)

(52) U.S. Cl.
CPC .......... *G01S 19/20* (2013.01); *G01S 19/215* (2013.01); *H04K 3/22* (2013.01); *H04K 3/65* (2013.01); *H04K 3/90* (2013.01); *H04K 2203/32* (2013.01)

(58) Field of Classification Search
CPC ......... G01S 19/20; G01S 19/215; H04K 3/90; H04K 3/22; H04K 3/65; H04K 2203/32
See application file for complete search history.

(56) References Cited

U.S. PATENT DOCUMENTS

| 5,557,284 | A | 12/1996 | Hartman |
| 6,256,583 | B1 * | 7/2001 | Sutton ............... G01S 19/55 342/357.36 |

(Continued)

FOREIGN PATENT DOCUMENTS

| EP | 0904551 A1 | 3/1999 |
| EP | 2650699 A1 | 4/2013 |

(Continued)

OTHER PUBLICATIONS

Swaszek, Peter F. et al., "Analysis of a Simple, Multi-Receiver GPS Spoof Detector", Proc. ION ITM, San Diego CA, Jan. 2013.*

(Continued)

*Primary Examiner* — Cassi J Galt
(74) *Attorney, Agent, or Firm* — Schmeiser, Olsen & Watts LLP

(57) ABSTRACT

Disclosed is a system and method for detecting false Global Navigation Satellite System (GNSS) satellite signals. False GNSS satellite signals can be used malevolently to take control of a body such as a vehicle or ship that is using GNSS satellite signals for navigation. In some embodiments a GNSS attitude system is used to detect the false GNSS satellite signals. The GNSS attitude system measures the code or carrier phase of the GNSS satellite signals at two or more antennas to detect the false GNSS satellite signals. In some embodiments the attitude system computes first measured and second estimated carrier phase differences in order to detect the false GNSS satellite signals. The attitude system may compute the attitude of a baseline vector between the two antennas. Once false GNSS satellite signals are detected, the method can include preventing the attitude determining system from outputting position or location data.

9 Claims, 17 Drawing Sheets

(56) References Cited

U.S. PATENT DOCUMENTS

| 6,469,663 | B1 | 10/2002 | Whitehead et al. |
| 7,292,185 | B2 | 11/2007 | Whitehead et al. |
| 7,310,062 | B1* | 12/2007 | Hwang .................. G01S 19/21 342/357.59 |
| 8,174,437 | B2 | 5/2012 | Whitehead |
| 2007/0247362 | A1 | 10/2007 | Strachan |
| 2009/0167597 | A1* | 7/2009 | Strachan ............... G01S 19/215 342/357.29 |
| 2013/0271316 | A1 | 10/2013 | Trautenberg et al. |
| 2014/0292576 | A1* | 10/2014 | Martin ................... G01S 19/215 342/357.59 |

FOREIGN PATENT DOCUMENTS

| EP | 2650699 A1 | 10/2013 |
| WO | WO 97/47987 A1 | 12/1997 |
| WO | WO 2006/085976 A2 | 8/2006 |

OTHER PUBLICATIONS

European Patent Office, European Search Report for Appl. No. EP 14 177 313.5, dated Feb. 4, 2015, pp. 1-9, Munich Germany.

John Lister, "Bogus GPS Signal Sends Ship Off Course", Infopackets.com, Aug. 1, 2013, pp. 1-2, http://www.infopackets.com/news/security/2013/20130801_bogus_gps_signal_sends_ship_off_course.htm.

Dee Ann Davis, "GPS Spoofing Experiment Knocks Ship off Course", Inside GNSS (Engineering Solutions from the Global Navigation Satellite System Community), Jul. 31, 2013, pp. 1-4, http://www.insidegnss.com/node/3659.

Logan Scott, "Location Assurance", GPS World, Jul. 2007, pp. 12-17, www.gpsworld.com.

Timothy J. Seppala, "University of Texas students send yacht off-course with GPS exploit", engadget, Jul. 30, 2013, pp. 1-2, http://www.engadget.com/2013/07/30/university-og-texas-yacht-hack-experiment.

Dave Doolittle et al., "UT students use fake GPS signals to take over superyacht", HispanicBusiness.com, Jul. 30, 2013, p. 1, http:www.hispanicbusiness.com/2013/7/29/ut_students_use_fake_gps-_signals.htm.

European Patent Office, Substantive Examination of Appl. No. 14177313.5, Feb. 21, 2017, pp. 1-8, Munich, Germany.

\* cited by examiner

SYSTEM AND METHOD FOR DETECTING FALSE GLOBAL NAVIGATION SATELLITE SYSTEM SATELLITE SIGNALS

CROSS REFERENCE TO RELATED APPLICATION

This application claims priority to U.S. Provisional Patent Application to Michael L. Whitehead entitled "False GNSS Satellite Signal Detection System" Ser. No. 61/865,935 filed Aug. 14, 2013, the disclosure of which is hereby incorporated entirely herein by reference.

BACKGROUND OF THE INVENTION

Technical Field

This invention relates generally to a Global Navigation Satellite System (GNSS), and more specifically to a system and method for detecting false GNSS satellite signals.

State of the Art

Global Navigation Satellite Systems are in widespread use to determine the location and/or attitude of a body. A GNSS includes a network of satellites that broadcast GNSS radio signals. GNSS satellite signals allow a user to determine, with a high degree of accuracy, the location of a receiving antenna, the time of signal reception and/or the attitude of a body that has a pair of receiving antennas fixed to it. Location is determined by receiving GNSS satellite signals from multiple satellites in known positions, determining the transition time for each of the signals, and solving for the position of the receiving antenna based on the known data. The location of two or more receiving antennas that have known placements relative to an object can be used to determine the attitude of the object. Examples of GNSS systems include Naystar Global Positioning System (GPS), established by the United States; Globalnaya Navigatsionnay Sputnikovaya Sistema, or Global Orbiting Navigation Satellite System (GLONASS), established by the Russian Federation and similar in concept to GPS; the BeiDou Navigation Satellite System (BDS) created by the Chinese; and Galileo, also similar to GPS but created by the European Community and slated for full operational capacity in the near future.

The GNSS is used extensively to navigate vehicles such as cars, boats, farm machinery, airplanes, and space vehicles. A problem is that 'false' GNSS signals can be used to 'spoof', or trick, a GNSS navigational system into straying off course or to provide an inaccurate time. Sophisticated GNSS spoofing systems can be used to take control of a navigational system and reroute a vehicle to an unintended location. Spoofing systems can be used for malevolent purposes—to steal, harm, reroute, or destroy important vehicles and machinery, or to allow false transactions to occur. Thus what is needed is a system to detect the presence of false GNSS satellite signals. Once the presence of false GNSS satellite signals is detected, the navigational system can be prevented from being influenced by the false GNSS satellite signals.

DETAILED DESCRIPTION OF EMBODIMENTS OF THE INVENTION

Figure 1:
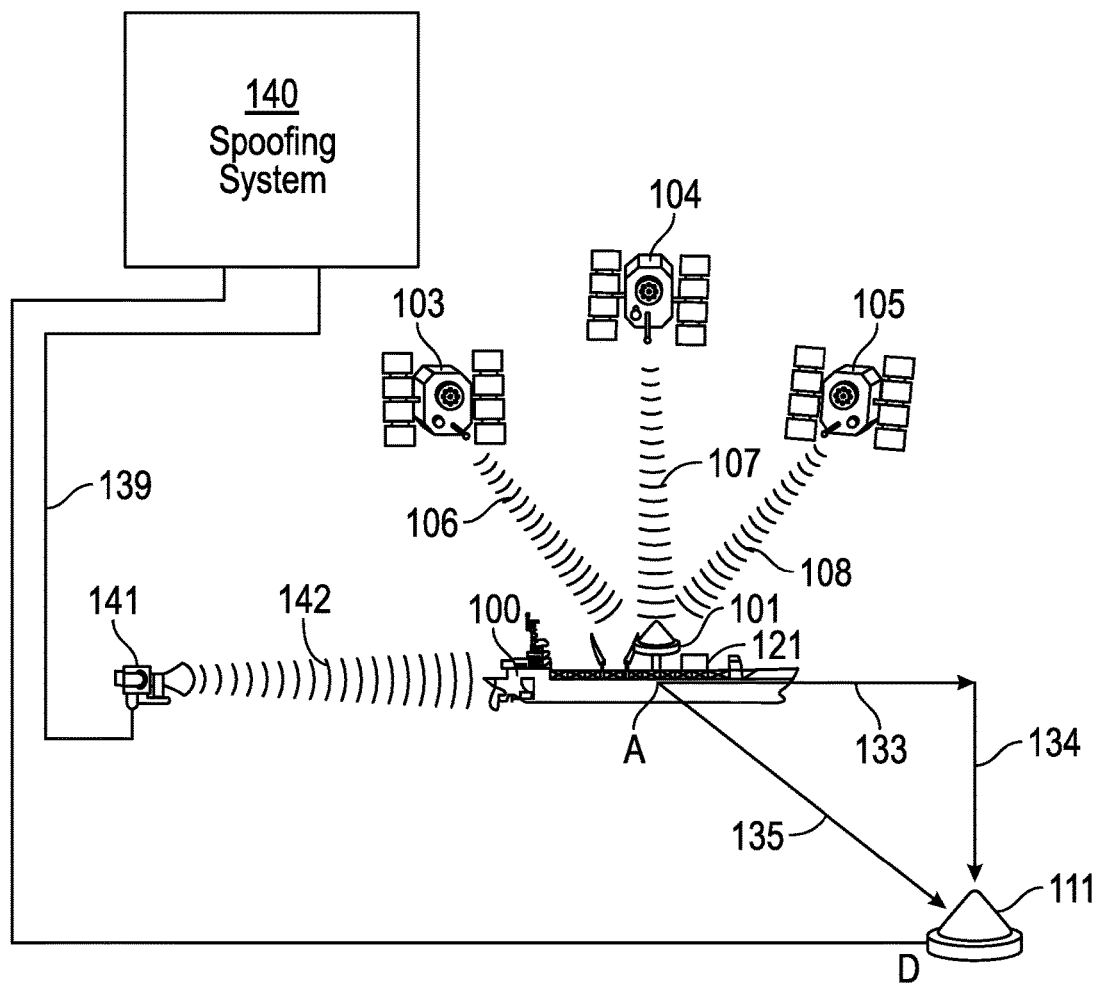
FIG. 1 is a depiction of a vessel that is subject to spoofing.

As discussed above, embodiments of the invention relate to a Global Navigation Satellite System (GNSS) and more specifically to a system and method for detecting false GNSS satellite signals. Some disclosed embodiments use a GNSS-based navigational system to measure the phase of a GNSS satellite signal at two or more antennas. The phase is used in some embodiments to determine if the antennas are receiving a false GNSS satellite signal. The phase of the GNSS satellite signal can be the code phase or the carrier phase of the GNSS satellite signal. In some embodiment a GNSS attitude determining system computes the carrier phase differences of a GNSS satellite signal at two or more antennas. The carrier phase difference is used in some embodiments to determine if the antennas are receiving a false GNSS satellite signal. In some embodiments the code phase difference is used to detect false GNSS satellite signals instead of the carrier phase. In some embodiments a first measured carrier phase difference is used to compute a second geometrical carrier phase difference of the GNSS satellite signal at the same antennas. The amount of agreement or error between the first measured and the second geometric computation of the carrier phase difference of the GNSS satellite signal at the two antennas is used to determine whether the system is receiving false GNSS satellite signals.

False GNSS satellite signals are GNSS satellite signals which contain incorrect data. Incorrect data mean the data in the signal does not correctly identify the satellite it came from, or the transit time from the satellite to the antenna, or it has other false or misleading data included in the false GNSS satellite signal, which will result in incorrect range, location, timing or attitude calculations. A false GNSS satellite signal with incorrect data can be used to mislead a GNSS navigational system and/or a GNSS timing system.

False GNSS satellite signals need not originate from any GNSS and need not originate from any earth-orbiting satellite. False GNSS satellite signals include those signals that are simulated—in other words they do not ever originate from a GNSS satellite, although they are formed to simulate a GNSS satellite signal and, ultimately, be accepted by a receiving antenna as a real GNSS signal. False GNSS satellite signals also include those signals that originate from a GNSS satellite, but they are ignorantly or maliciously received and re-broadcast such that they can no longer be used to measure an antenna location or provide an accurate timing signal. In a general sense, false GNSS signals include any signal which contains invalid satellite data, but is of a form that will be accepted by a GNSS antenna and receiver and, without intervention, will be used by the GNSS receiver to perform a (false) location or attitude computation. The disclosed embodiments of the invention describe a system and method for detecting false GNSS satellite signals so that intervention can occur, preventing the navigational system from providing false location or navigational data.

A GNSS includes a network of satellites that broadcast GNSS radio signals, enabling a user to determine the location of a receiving antenna with a high degree of accuracy. A GNSS can also be used to determine the attitude of an object, by determining the position of two or more receiving antennas that have known placements relative to the object.

Currently the longest running of the available GNSS, GPS, was developed by the United States government and has a constellation of 24 satellites in 6 orbital planes at an altitude of approximately 26,500 km. The first satellite was launched in February 1978. Initial Operational Capability (IOC) for the GPS was declared in December 1993. Each satellite continuously transmits microwave L-band radio signals in two frequency bands, L1 (1575.42 MHz) and L2 (1227.6 MHz). The L1 and L2 signals are phase shifted, or modulated, by one or more binary codes. These binary codes provide timing patterns relative to the satellite's onboard precision clock (synchronized to other satellites and to a ground reference through a ground-based control segment), in addition to a navigation message giving the precise orbital position of each satellite, clock correction information, and other system parameters.

GNSS navigation or attitude systems use measurements of the GNSS satellite signal phase—either code phase or carrier phase—in order to perform their computations. The binary codes providing the timing information are called the C/A Code, or coarse acquisition code, and the P-code, or precise code. The C/A Code is a 1 MHz Pseudo Random Noise (PRN) code modulating the phase of the L1 signal, and repeating every 1023 bits (one millisecond). The P-Code is also a PRN code, but modulates the phase of both the L1 and L2 signals, and is a 10 MHz code repeating every seven days. These PRN codes are known patterns that can be compared to internal versions in the receiver. The GNSS receiver is able to compute an unambiguous range to each satellite by determining the time-shift necessary to align the internal code phase to the broadcast code phase. Since both the C/A Code and the P-Code have a relatively long "wavelength"—approximately 300 meters (or 1 microsecond) for the C/A Code, and 30 meters (or 1/10 microsecond) for the P-Code, positions computed using them have a relatively coarse level of resolution. The code phase measurements are used in some embodiments of the invention to detect false GNSS satellite signals.

To improve the positional accuracy provided by use of the C/A Code and the P-Code, a receiver may take advantage of the carrier component of the L1 or L2 signal. The term "carrier", as used herein, refers to the dominant spectral component remaining in the radio signal after the spectral content resulting from the modulating PRN digital codes has been removed (e.g., from the C/A Code and the P-Code). The L1 and L2 carrier signals have wavelengths of about 19 centimeters and 24 centimeters, respectively. The GPS receiver is able to track these carrier signals and measure the carrier phase $\varphi$ to a small fraction of a complete wavelength, permitting range measurement to an accuracy of less than a centimeter. These carrier phase $\varphi$ measurements are used by embodiments of the invention described herein to detect false GNSS satellite signals.

FIG. 1 depicts a situation where vessel 100 using GNSS navigation is subjected to spoofing—or in other words is receiving false GNSS satellite signals. Vessel 100 receives real GNSS satellite signals 106, 107, and 108 from a plurality of GNSS satellites 103, 104 and 105, respectively. GNSS satellite signals 106, 107 and 108 are received by antenna 101 which is located at physical location A. GNSS receiver 121, which is electrically connected to antenna 101, receives signals 106, 107, and 108, and computes the GNSS location coordinates of location A based on measurements of ranging information contained within signals 106, 107 and 108. Vessel 100 in this embodiment has an autopilot system that steers vessel 100 over a prescribed course using the computed GNSS coordinates of location A. It is to be understood that while antenna 101 is shown receiving GNSS satellite signals 106, 107, and 108 from three GNSS satellites 103, 104, and 105, antenna 101 can be receiving GNSS satellite signals from any number of GNSS satellites. Antenna 101 receives GNSS satellite signals from a plurality of GNSS satellites, where a plurality is any number greater than one.

Figure 2:
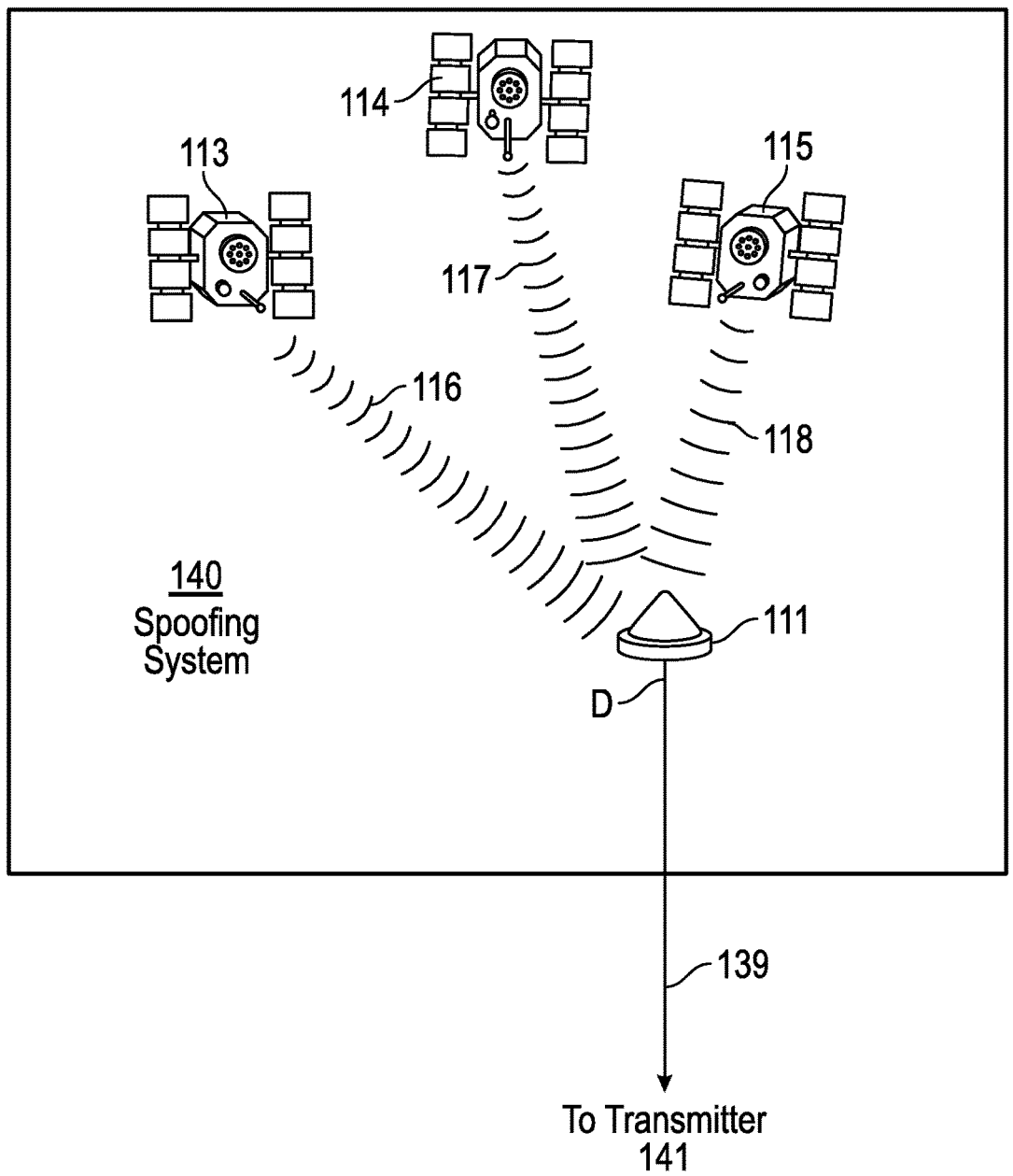
FIG. 2 is an example embodiment of a spoofing system for creating false GNSS satellite signals.

Antenna 101 in the embodiment shown in FIG. 1 is also receiving spoofing signal 142 from spoofing system 140 (also shown in FIG. 2). Spoofing signal 142 is a composite signal which contains a plurality of false GNSS satellite signals. Spoofing signal 142 is generated so as to mimic real GNSS satellite signals. Spoofing system 140 transmits spoofing signal 142 through cable 139 to transmitter 141. Transmitter 141 broadcasts spoofing signal 142 to antenna 101.

GNSS signal spoofing system 140 can be designed to create false GNSS satellite signals in many ways. In some embodiments spoofing system 140 creates spoofing signal 142 by simulating real GNSS satellite signals programmed with the desired false satellite data. FIG. 2 is an example embodiment of spoofing system 140 of FIG. 1, which in this embodiment captures real GNSS signals 116, 117, and 118 at antenna 111, and then rebroadcasts these signals with transmitter 141. In the embodiment shown in FIG. 1 and FIG. 2, spoofing system 140 creates spoofing signal 142 by re-broadcasting live GNSS signals received at a location different from the GNSS navigational system that is to be spoofed. It is to be understood that spoofing system 140 can create and broadcast spoofing signal 142 using any method that creates a spoofing signal 142 that includes data meant to be accepted as real GNSS signals.

In the embodiment shown in FIG. 1 through FIG. 2 spoofing system 140 includes spoof antenna 111, and transmitter 141. Spoofing system 140 generates spoofing signal 142 by re-broadcasting GNSS satellite signals 116, 117 and 118 received at spoof antenna 111 from live GNSS satellites 113, 114 and 115. Satellites 113, 114, and 115, can be the same or different GNSS satellites as satellites 103, 104, and 105. Spoof antenna 111 is located at spoof location D. In this embodiment spoof location D is offset from vessel location A by vectors 133 and 134, creating a total locational offset shown by vector 135. Real GNSS satellite signals 116, 117, and 118 are combined into composite spoofing signal 142 and rebroadcast by transmitter 141. Note that spoofing signal 142 is a composite of a plurality of GNSS satellite signals 116, 117, and 118, as received by antenna 111. When GNSS satellite signals 116, 117, and 118 are rebroadcast from transmitter 141, they become false GNSS satellite signals because they contain data as received by antenna 111 at location D. Spoofing signal 142 in this embodiment contains three false GNSS satellite signals, but it is to be understood that spoofing signal 142 can contain any number of false GNSS satellite signals.

The power level of spoofing signal 142 is set such that when spoofing signal 142 is received by antenna 101, spoofing signal 142 overpowers real GNSS satellite signals 106, 107 and 108. Consequently receiver 121 uses spoofing signal 142 to compute a GNSS location based on false GNSS satellite signals 116, 117, and 118. Specifically, receiver 121 will measure the GNSS satellite signal phase (code phase and/or carrier phase) φ values of false GNSS satellite signals 116, 117, and 118, will use the code phase and/or the carrier phase φ values to compute GNSS location coordinates for location D, and will report that vessel 100 is at location D instead of its true location A. This false location D will be offset from true location A by vectors 133 and 134, for a total positional error given by vector 135. The navigational system of vessel 100 will believe it is at location D and plot its course accordingly. This is the intent of spoofing system 140 in some embodiments,—to make receiver 121 believe, and report, that vessel 100 is at false location D that is offset relative to the known or assumed location A of the GNSS system to be spoofed. Spoofing of a navigational system can also be performed in order to make a navigational device provide false timing data. GNSS devices are often used in critical timing applications. Thus in some embodiments detection of false GNSS satellite signals is performed to prevent a spoofing system from causing false timing data to be provided by a GNSS device.

Note that any transmission delay of spoofing signal 142 along cable 139 or due to being rebroadcast is seen as a common clock delay on all GNSS spoofing signals, and this delay is solved for as part of the receiver 121 computations. The delay causes a small, often undetectable receiver clock offset, but computation of the false GNSS location still takes place.

Described herein is a system and method for detecting the presence of false GNSS satellite signals such as spoofing signal 142, where spoofing signal 142 comprises false data that represents itself as one or more than one GNSS satellite signal from one or more than one GNSS satellite. The system and method for detecting false GNSS satellite signals according to embodiments of the invention uses a plurality of GNSS antennas for determining that at least one of the GNSS satellite signals received is a false GNSS satellite signal, in other words it contains false data. The system disclosed herein for detecting false GNSS satellite signals is in some embodiments a GNSS attitude system. GNSS attitude systems use two or more GNSS antennas attached to a rigid body for determining the attitude of the body.

Figure 3:
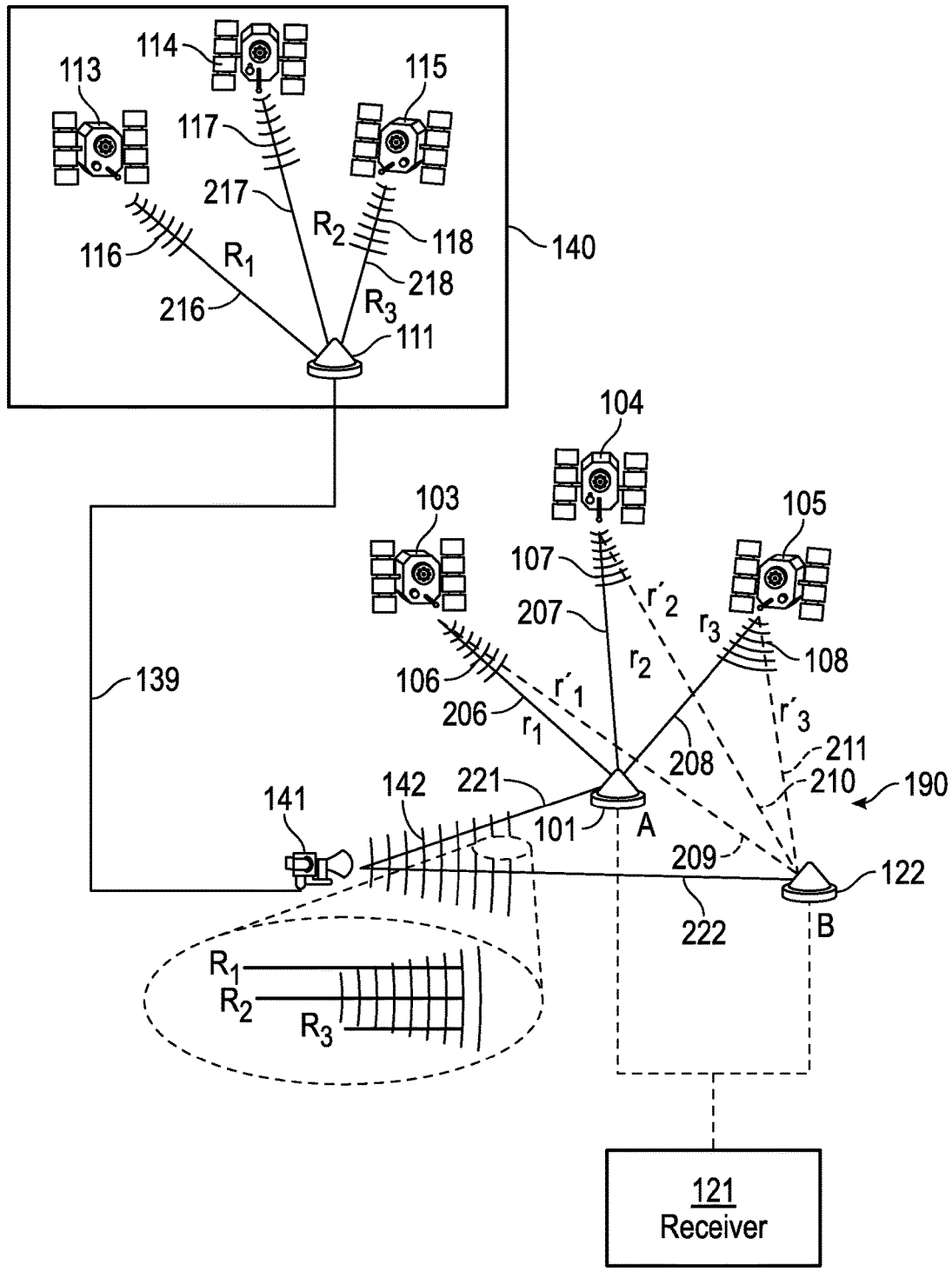
FIG. 3 shows a system for detecting the presence of false GNSS satellite signals according to an embodiment of the invention.

FIG. 3 shows an embodiment of system 190 for detecting false GNSS satellite signals. In the embodiment shown in FIG. 3, vessel 100 of FIG. 1 includes system 190 for detecting false GNSS satellite signals. In the embodiment of the invention shown in FIG. 3, system 190 has two GNSS antennas, first antenna 101 and second antenna 122. Both first antenna 101 and second antenna 122 are receiving a plurality of GNSS satellite signals, which in this embodiment includes GNSS satellite signals 106, 107, and 108. System 190 for detecting false GNSS satellite signals also includes receiver 121 connected to both first antenna 101 and second antenna 122. Receiver 121 receives GNSS satellite signals 106, 107, and 108 from first antenna 101 and second antenna 122, measures GNSS satellite signal phase φ values (either code or carrier phase) of the GNSS satellite signals, and performs the range, location and attitude computations as required.

As shown in FIG. 3, GNSS spoofing is taking place to system 190 on vessel 100 of FIG. 1. Spoofing signal 142 is being received by first antenna 101 of vessel 100, just as shown and described in FIG. 1 and FIG. 2, except in the embodiment shown in FIG. 3, vessel 100 includes system 190 for detecting false GNSS satellite systems. Antennas 101 and 122 are both fixed to vessel 100 of FIG. 1, at locations A and B respectively. Vessel 100 is not shown in FIG. 3 for simplicity. Antennas 101 and 122 receive both the intended GNSS satellite signals 106, 107, and 108, and spoofing signal 142. Spoofing system 140 sends spoofing signal 142 along cable 139 and broadcasts spoofing signal 142 over transmitter 141. Spoofing system 140 generates spoofing signal 142 by rebroadcasting GNSS satellite signals 116, 117, and 118 from GNSS satellites 113, 114, and 115 as received by antenna 111 at GNSS location D, as shown in FIG. 2. GNSS satellite signals 116, 117, and 118 contain timing information that enable the computation of ranges $R_1$, $R_2$, and $R_3$ representing the distance between satellites 113, 114, and 115, respectively, and antenna 111. Ranges $R_1$, $R_2$, and $R_3$ are denoted 216, 217, and 218 in FIG. 3. Range computations of $R_1$, $R_2$, and $R_3$ are made by receiver 121 of attitude system 190 from measurements of GNSS satellite signal phase φ of GNSS satellite signals 116, 117, and 118 as received by antenna 111. Note that range measurements $R_1$, $R_2$, and $R_3$ will be computed by any GNSS receiver that is receiving and processing spoofing signal 142.

The intended, real GNSS satellite signals 106, 107, and 108, are broadcast by satellites 103, 104 and 105 as shown in FIG. 1 and FIG. 3. GNSS satellite signals 106, 107, and 108 travel from satellites 103, 104, and 106, respectively, to antenna 101 that is located at A. Under normal operation, GNSS receiver 121 connected to antenna 101 would measure GNSS satellite signal code or carrier phase φ values for GNSS satellite signals 106, 107, and 108 as received by antenna 101, and compute ranges $r_1$, $r_2$, and $r_3$ (denoted 206, 207, and 208 in FIG. 3) representing the distance between satellites 103, 104, and 105 and antenna 101.

Additionally, GNSS satellite signals 106, 107, and 108 from GNSS satellites 103, 104 and 105, travel to antenna 122 located at B. Under normal operation, GNSS receiver 121 connected to antenna 122 would measure GNSS satellite signal code or carrier phase φ values for GNSS satellite signals 106, 107, and 108 as received by antenna 122, and compute ranges $r'_1$, $r'_2$, and $r'_3$ (denoted 209, 210, and 211 in FIG. 3) as the distance between GNSS satellites 103, 104, and 105 and antenna 122.

Again under normal operation, GNSS receiver 121 uses the range $r_1$, $r_2$, and $r_3$ computations to compute GNSS location A for the location of antenna 101, where GNSS location A approximately coincides with the location of antenna 101 to the accuracy of the receiver. As well, under normal operation, GNSS receiver 121 connected to antenna 122 uses the $r'_1$, $r'_2$, and $r'_3$ range values and computes a GNSS location B that approximately coincides with the location of antenna 122. Computed ranges $r'_1$, $r'_2$, and $r'_3$ are different from $r_1$, $r_2$, and $r_3$. And the two GNSS locations A and B computed by receiver 121 connected to antennas 101 and 122 are different GNSS locations under normal operation, because locations A and B are not physically co-located. In some embodiments, the measured range differences $r_1 - r'_1$, $r_2 - r'_2$, and $r_3 - r'_3$, rather than the computed ranges are used to compute GNSS locations.

During spoofing, signal 142 overpowers real GNSS satellite signals 106, 107, and 108. Signal 142 is received by both antenna 101 and antenna 122. GNSS receiver 121 connected to first antenna 101 and second antenna 122 measures GNSS satellite signal carrier phase φ values and computes ranges of $R_1$, $R_2$, and $R_3$ as if received by antenna 111 instead of the intended ranges ($r_1$, $r_2$, $r_3$ and $r'_1$, $r'_2$, $r'_3$). GNSS receiver 121 measures identical ranges of $R_1$, $R_2$, and $R_3$ for what receiver 121 believes to be the path length to satellites 103, 104, and 105 from both antenna 101 and antenna 122. Therefore, one method for system 190 to use to detect false GNSS satellite signals is to compute one or more range differences, where a range difference is the difference between the range to a specific GNSS satellite from a first antenna, and the range to the same specific GNSS satellite from a second antenna. Because the range is calculated to two different antennas, the two ranges should be different and the range difference should be larger than a predetermined threshold range difference value. If the ranges are the same or close to the same value, the range difference will be small or zero. If the range difference is small or zero—smaller than the predetermined threshold range difference value, for example—then this can be used as an indication that one or more of the GNSS satellite signals is a false GNSS satellite signal. Or if all pseudo range differences have roughly the same value—due to receiver clock differences or transmission delay—then the system is being spoofed. Transmission delay between antennas is the same for all false GNSS satellite signals (spoofing signals) since they follow the same path. Pseudo ranges are ranges that still have clock or delay components present.

Figure 4:
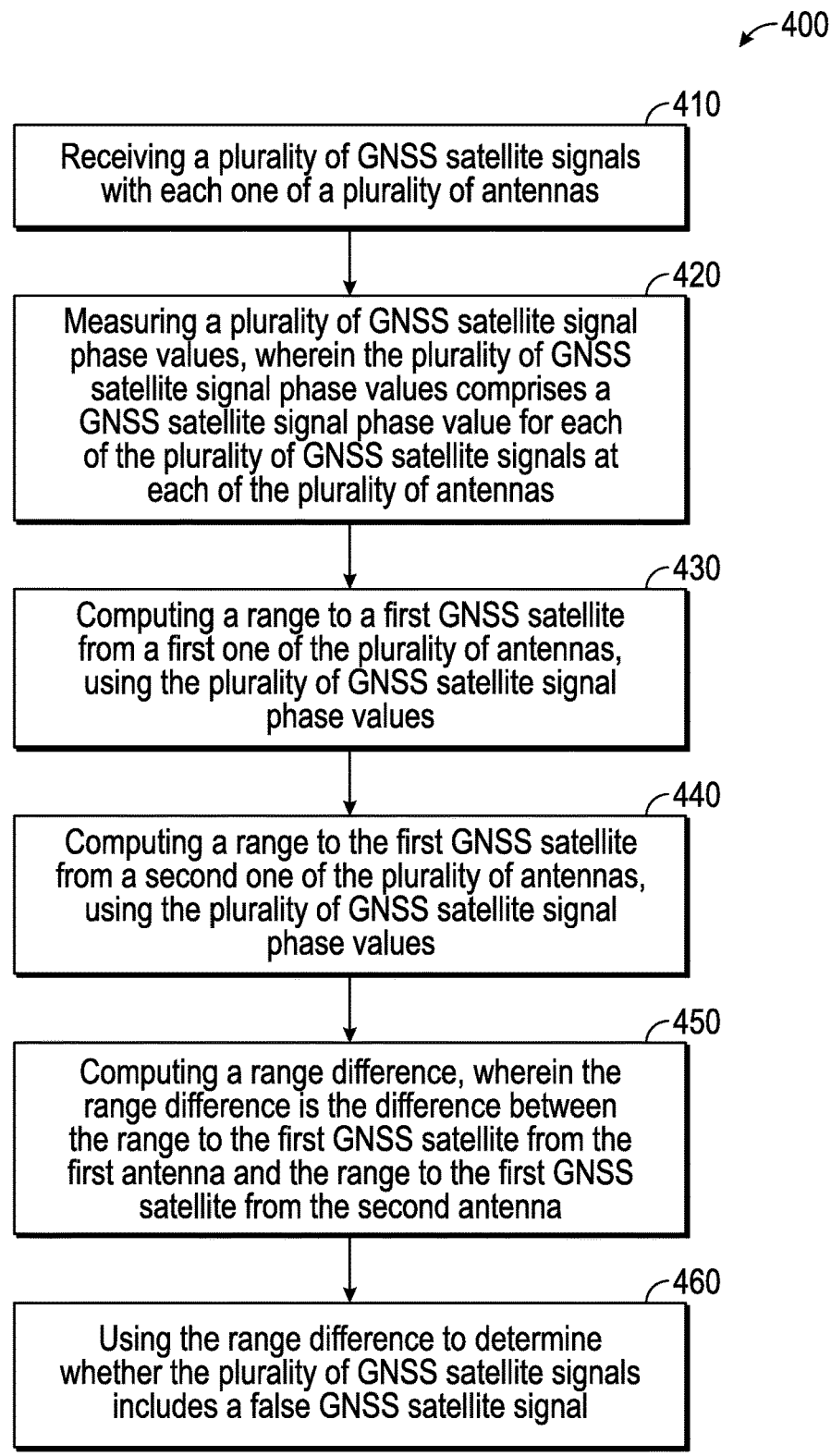
FIG. 4 illustrates a method of detecting false GNSS satellite signals according to an embodiment of the invention.

FIG. 4 illustrates method 400 of detecting false GNSS satellite signals according to embodiments of the invention, using measured range differences as described above. Method 400 includes element 410 of receiving a plurality of GNSS satellite signals with each one of a plurality of antennas. FIG. 3 shows two antennas 101 and 122, but the plurality of antennas can include any number of antennas greater than one. FIG. 3 shows three GNSS satellite signals 106, 107, and 108 in the normal non-spoofing environment, or GNSS satellite signals 116, 117, and 118 in the spoofed environment, but the plurality of GNSS satellite signals can include any number of satellite signals greater than one.

Method 400 includes element 420 of measuring a plurality of GNSS satellite signal phase φ values. The plurality of GNSS satellite signal phase φ values includes a GNSS satellite signal phase φ value for each of the plurality of GNSS satellite signals at each of the plurality of antennas.

Method 400 also includes element 430 of computing a range to a first GNSS satellite from a first one of the plurality of antennas, using the plurality of GNSS satellite signal phase φ values. Each range is the distance between one of the plurality of antennas and one of a plurality of GNSS satellites. The plurality of GNSS satellites are the GNSS satellites broadcasting the plurality of GNSS satellite signals. In FIG. 3 in the non-spoofing situation, the plurality of GNSS satellites is shown as three GNSS satellites 103, 104, and 105, broadcasting the plurality of real GNSS satellite signals 106, 107, and 108. In the spoofing situation the plurality of GNSS satellites is shown as three GNSS satellites 113, 114, and 115 broadcasting the plurality of GNSS satellite signals 116, 117, and 118, which are combined into spoofing signal 142. Each of the above pluralities can be any number greater than one. For example, in a normal situation with no false GNSS satellite signals, element 430 will include receiver 121 of system 190 of FIG. 3 computing range $r_1$ from first antenna 101 to GNSS satellite 103. In a spoofing environment where first antenna 101 is receiving spoofing signal 142, element 430 will include receiver 121 computing range $R_1$ from first antenna 101 to GNSS satellite 103.

Method 400 also includes element 440 of computing a range to the first GNSS satellite from a second one of the plurality of antennas, using the plurality of GNSS satellite signal phase φ values. Continuing with the example above, in a normal situation with no false GNSS satellite signals, element 440 will include receiver 121 computing range $r'_1$ from second antenna 122 to GNSS satellite 103. In a spoofing environment where second antenna 122 is receiving spoofing signal 142, element 440 will include receiver 121 computing range $R_1$ from second antenna 122 to GNSS satellite 103. Note that in the non-spoofing environment the ranges $r_1$ and $r'_1$ are different because the antennas 101 and 122 are in different locations and thus the path lengths $r_1$ and $r'_1$ are different. But in the spoofing environment when first and second antennas 101 and 122 are receiving false GNSS satellite signals 116, 117, and 118 in spoofing signal 142, receiver 121 will compute range $R_1$—the same range value—for the range between both first antenna 101 and second antenna 122, and GNSS satellite 103, because the data received by both first antenna 101 and second antenna 122 reflects a range $R_1$ from spoofing antenna 111 and GNSS satellite signal 113.

Method 400 according to embodiments of the invention also includes element 450 of computing a range difference, where the range difference is the difference between the range to the first GNSS satellite from the first antenna, and the range to the first GNSS satellite from the second antenna. Continuing the example, element 440 in the normal, non-spoofing environment will include computing the difference between $r_1$ and $r'_1$. This difference should reflect the fact that the antennas 101 and 122 are in different locations. In the spoofing environment element 440 will include computing the difference between $R_1$ and $R_1$. Since the range measurements in the spoofing environment are the same within computational accuracy, the range difference in the spoofing environment should be zero or some small number that results from a small amount of computational error in each range calculation.

Method 400 also includes element 460 of using the range differences to determine whether the plurality of GNSS satellite signals includes a false GNSS satellite signal. In some embodiments the range difference is compared to a predetermined threshold range difference. If the range difference is smaller than the predetermined threshold range difference, then it is determined that the plurality of GNSS satellite signals includes a false GNSS satellite signal. If the range difference is larger than the predetermined threshold range difference, then it is determined that the plurality of GNSS satellite signals does not include a false GNSS satellite signal. In some embodiments a plurality of range differences is computed, using the plurality of GNSS satellite signals as received by the plurality of antennas to measure and difference a plurality of ranges. Element 460 can include many different ways and methods of comparing the range difference or differences. Method 400 can include many other elements. In some embodiments method 400 includes the element of preventing the system from outputting a locational output in response to determining that the plurality of GNSS satellite signals includes at least one false GNSS satellite signal. Preventing the locational data from being output is one way to keep false GNSS satellite signals from being successful in taking over control of a navigational system or other system that is using the antennas for a purpose.

In the spoofed environment, where first antenna 101 and second antenna 122 are receiving spoofing signal 142 containing GNSS satellite signals 116, 117, and 118 in the embodiment shown in FIG. 3, GNSS receiver 121 measures the same or similar ranges $R_1$, $R_2$, and $R_3$ for the path length to satellites 103, 104, and 105 (because the data is really from GNSS satellites 113, 114, and 115) from both antenna 101 and antenna 122. Receiver 121 will use these values to compute substantially the same GNSS location, within a locational margin of error, for both GNSS location A of antenna 101 and GNSS location B of antenna 122. Receiver 121 of system 190 does not know the GNSS location of point A and point B beforehand, but it may know the relative distance between point A and point B. Therefore a second method for system 190 to use to detect false GNSS satellite signals is to compare the computed GNSS locations A and B. System 190 will determine that it is receiving a false GNSS satellite signal in response to the computed GNSS locations of antennas 101 and 122 being the same GNSS locational value within a locational margin of error. In some embodiments this method includes computing a GNSS location for each of the plurality of antennas using the plurality of ranges, and determining that the plurality of GNSS satellite signals includes a false GNSS satellite signal in response to the computed GNSS locations for each of the plurality of antennas being the same GNSS locational value within a locational margin of error.

Thus, two-antenna GNSS system 190 according to an embodiment of the invention as shown in FIG. 3 is able to detect spoofing in many cases. Note that spoofing signal 142 may transverse different paths, 221 and 222 to travel to antennas 101 and 122. The difference in path length and thus signal travel time of spoofing signal 142 along paths 221 and 222 will result in receiver 121 connected to antennas 101 and 122 computing different receiver clock offsets. However, this will not affect the range or location calculations. When receiving spoofing signal 142, system 190 will compute ranges and GNSS locations A and B that are the same values to within the accuracy of receiver 121. It is to be understood that while first antenna 101 and second antenna 122 are shown connected to one common receiver 121, each antenna could have its own GNSS receiver, with a common processor comparing the data to determine that the computed GNSS locations A and B are the same locational value within a locational margin of error.

Figure 5:
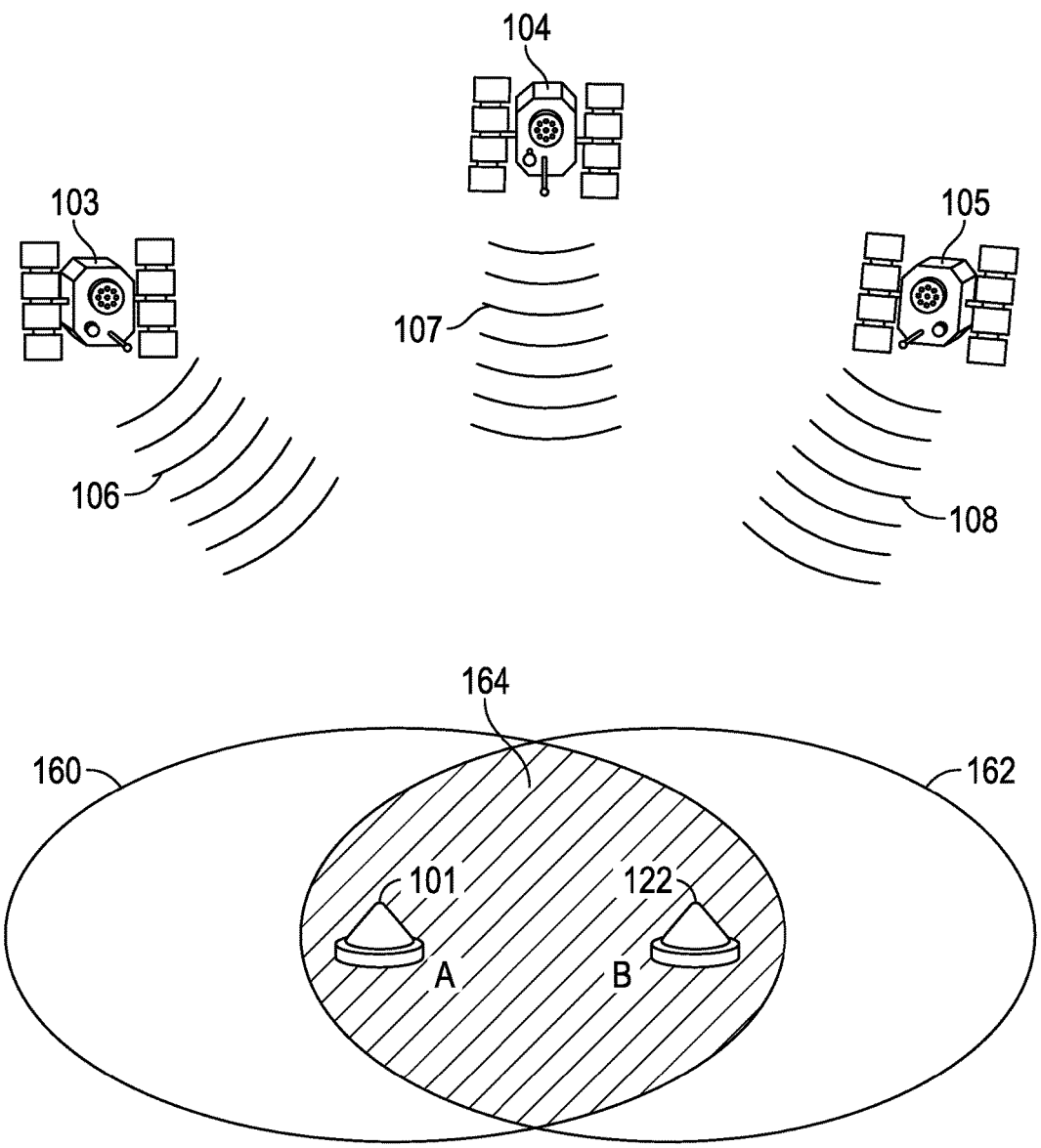
FIG. 5 illustrates two antennas and their overlapping locational margin of error.

This method of detecting false GNSS satellite signals by comparing the computed GNSS locations of two or more antennas can have issues in some cases. In particular, if the distance between the first and the second antennas 101 and 122 is smaller than the locational margin of error as computed by each receiver, then it may not be possible to determine whether the locations are the same within the locational margin of error. This is illustrated in FIG. 5. FIG. 5 shows antenna 101 at location A of FIG. 3, and antenna 122 at location B of FIG. 3. Each antenna is receiving GNSS satellite signals 106, 107, and 108 from GNSS satellites 103, 104, and 105 respectively. Receiver 121 (FIG. 3) calculates the GNSS location of receiver 101, which is accurate to within a location margin of error 160 as shown in FIG. 5. Receiver 121 also calculates the GNSS location of receiver 122 which is accurate to within a location margin of error 162 as shown in FIG. 5. A locational margin of error is the area of uncertainty which surrounds the GNSS location calculation due to error and imprecision in the measurements of range. Locational margin of errors 160 and 162 are shown as two-dimensional ovals in FIG. 5, but it is to be understood that they are three-dimensional areas such as spheres, ovoids, or other three-dimensional areas. Cross-hatched area 164 as shown in FIG. 5 represents area of overlap 164 of the two locational margins of error 160 and 162. When antenna 101 and antenna 122 are close enough to each other that they both reside within area of overlap 164 as shown in FIG. 5, it is not possible to determine accurately whether the computed GNSS locations of location A and location B are the same GNSS location or not, because their locational margins of error overlap.

One way to alleviate the potential for false detection using the two antenna method is to ensure that the distance from antenna 101 to antenna 122 is sufficiently large that their respective locational margins of error 160 and 162 do not intersect. A disadvantage of doing this, however, is that it requires more installation space and possibly longer cables, and thus a less compact system. Minimizing the size of the locational margins of error 160 and 162 is a viable solution, which can be done with a GNSS attitude system, as will be discussed shortly.

It is to be understood that while sets of three satellites are shown and described in FIG. 1 through FIG. 5, resulting in a set of three GNSS satellite signals being sent, the set of three is an example only. In general a plurality of GNSS satellites is used for GNSS satellite signal code or carrier phase φ, range, location, and attitude measurements and computations, where a plurality is any number larger than one. A plurality of GNSS satellites are used by system 190, which results in each antenna receiving a plurality of GNSS satellite signals. And while first and second antennas 101 and 122 are shown and described, in general a plurality of antennas are used by system 190, where a plurality is any number greater than one. Throughout this document, sets of two or three GNSS satellites, GNSS satellite signals, and antennas are shown and described to simplify the drawings and the explanation, but it is to be understood that often the numbers of satellites, satellite signals, and/or antennas is a number greater than two or three, and in fact can be any number greater than one.

A GNSS attitude system (also referred to as a GNSS attitude determining system) has the capability of executing a variety of measurements and computations which allow it to determine with high accuracy whether GNSS satellite signals are false GNSS satellite signals, while minimizing the limitations of using the measured ranges or computed GNSS locations as described above. A GNSS attitude system has a minimum of two antennas and computes ranging differences by differencing the GNSS satellite signal code or carrier phase φ values measured at the two or more antennas. A basic GNSS attitude system and method of using the GNSS attitude system to detect false GNSS satellite signals is described below. More details on GNSS attitude systems and the computation of carrier phase differences can be found in related U.S. Pat. No. 7,292,185 to Whitehead.

Figure 6:
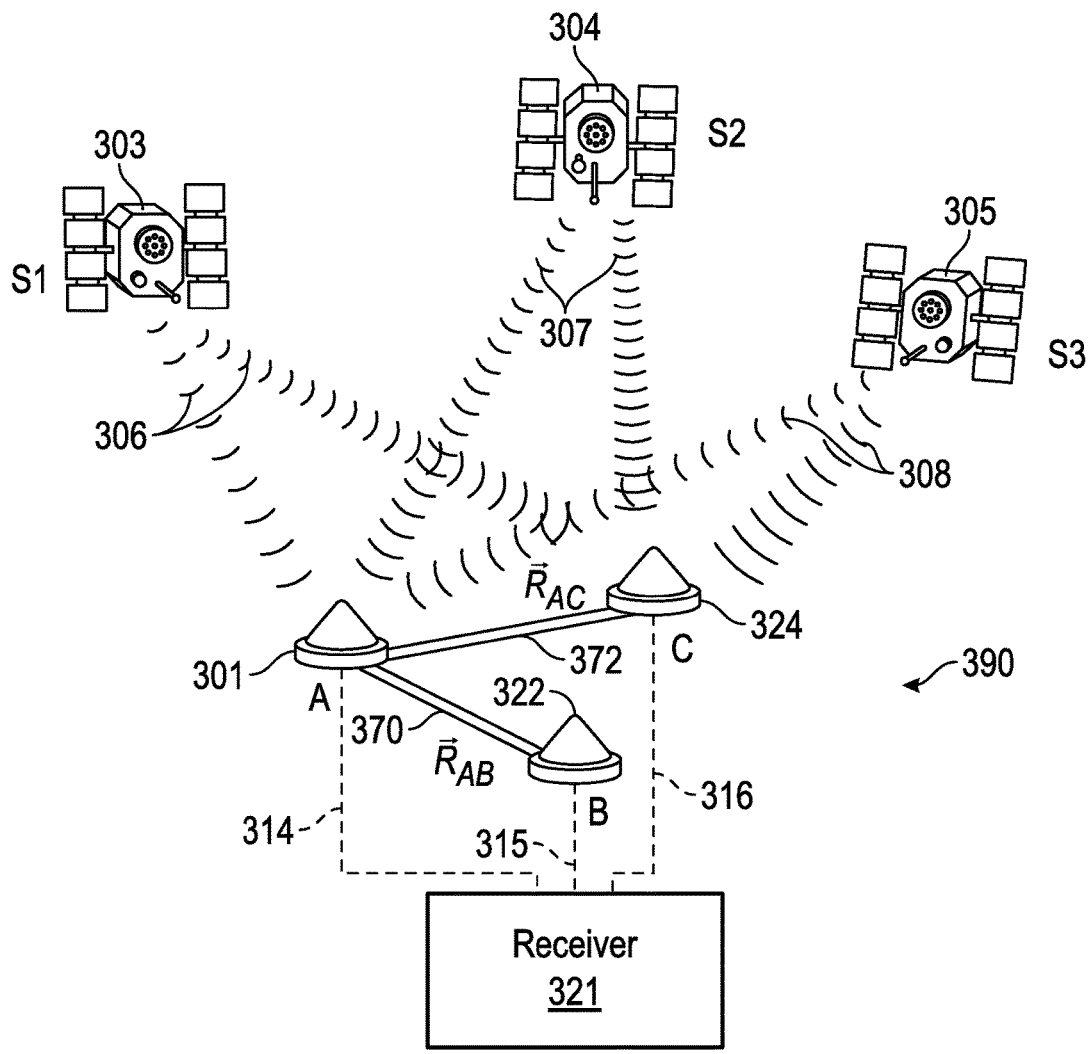
FIG. 6 shows an attitude determining system for detecting the presence of false GNSS satellite signals according to an embodiment of the invention.

FIG. 6 depicts attitude determining system 390 (also called attitude system 390 or system 390) according to an embodiment of the invention for determining the presence of false GNSS satellite signals. System 390 is shown tracking a plurality of GNSS satellites 303, 304, and 305, also referred to as S1, S2, and S3, respectively. System 390 includes a plurality of antennas 301, 322, and 324 at locations A, B, and C to receive GNSS satellite signals. Satellites 303, 304, and 305 broadcast radio frequency GNSS satellite signals 306, 307 and 308, respectively. GNSS satellite signals 306, 307 and 308 are received by the plurality of antennas 301, 322 and 324. Each GNSS satellite signal 306, 307, and 308 travels from each antenna 301, 322 or 324 to receiver unit 321 via connections 314, 315, or 316 respectively, where it is down-converted and digitally sampled so that it may be tracked by digital tracking loops of receiver 321. Various timing and navigation information is readily extracted while tracking each of the plurality of GNSS satellite signals 306, 307, and 308, including the phase of a Pseudo Random Noise (PRN) code timing pattern (often called code phase) that is modulated on each of the plurality of GNSS satellite signals 306, 307, and 308, the carrier phase φ of each GNSS satellite signal's carrier, and navigation data from which the location of each GNSS satellite may be computed. It will be appreciated that while three antennas 301, 322, and 324, three GNSS satellites 303, 304, and 305 and three GNSS satellite signals 306, 307 and 308 are used to depict the plurality of antennas, the plurality of GNSS satellites and the plurality of GNSS satellite signals in FIG. 6, a greater or lesser number of antennas, satellites and satellite signals can be used if desired.

In order to perform the prescribed functions and desired processing, as well as the computations therefor (e.g., the attitude determination processes, and the like), receiver 321 may include, but not be limited to, a processor(s), computer(s), memory, storage, register(s), timing, interrupt(s), communication interface(s), and input/output signal interfaces, and the like, as well as combinations comprising at least one of the foregoing. For example, receiver 321 may include signal interfaces to enable accurate down-conversion and digital sampling and tracking of GNSS satellite signals as needed, and to facilitate extracting the various timing and navigation information, including, but not limited to, the phase of the PRN code timing pattern.

Figure 7:
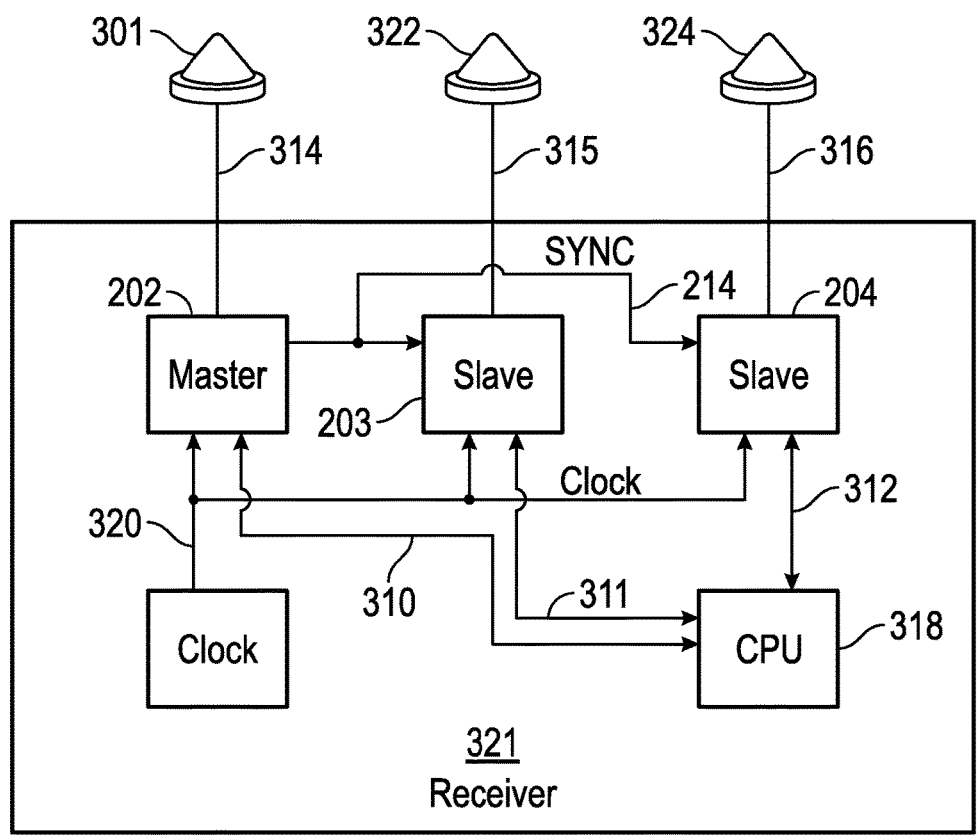
FIG. 7 shows a block diagram of an embodiment of a receiver of an attitude determining system.

FIG. 7 shows an example embodiment of receiver 321 of attitude determining system 390 of FIG. 6 that can be used for detecting the presence of false GNSS satellite signals. System 390 of FIG. 6 and FIG. 7 uses single receiver unit 321 containing multiple synchronized tracking devices 202, 203 and 204. Each tracking device 202, 203 and 204 is associated with exactly one antenna 301, 322 and 324 respectively. Each tracking device 202, 203 and 204 is capable of tracking a plurality of GNSS satellites. In this embodiment each tracking device 202, 203 and 204 is tracking each satellite 303, 304 and 305. Tracking devices 202, 203, and 204 serve the function of down converting the received Radio Frequency (RF) GNSS satellite signals 306, 307 and 308 arriving from the plurality of satellites 303, 304 and 305, sampling the composite signal, and performing high-speed digital processing on the composite signal (such as correlations with a PRN reference signal) that allow the code and carrier phase φ of each satellite to be tracked. Examples and further description of synchronized tracking devices such as tracking devices 202, 203 and 204 are described in commonly assigned U.S. Pat. No. 7,292,186 entitled Method and System for Synchronizing Multiple Tracking Devices For A Geo-location System, filed Jan. 5, 2005, the contents of which are incorporated by reference herein in their entirety. Each tracking device 202, 203 and 204 is connected to a single shared computer processing unit (CPU) 318 in this embodiment. CPU 318 sends control commands 310, 311 and 312 to the plurality of tracking devices 202, 203 and 204, respectively. Control commands 310, 311 and 312 enable tracking devices 202, 203 and 204 to track the plurality of GNSS satellites 303, 304 and 305. CPU 318 receives back from each tracking device 202, 203 and 204 code and carrier phase φ measurements of the plurality of GNSS satellite signals 306, 307 and 308.

Synchronization signal 214 is sent from master tracking device 202 to slave tracking devices 203 and 204. Sync signal 214 allows master tracking device 202 and slave tracking devices 203 and 204 to measure the code and carrier phase φ of each of the plurality of GNSS satellite signals 306, 307 and 308 simultaneously. Furthermore, the RF down conversion within each tracking device 202, 203 and 204 and the sampling of data by each tracking device 202, 203 and 204 is done using common clock signal 320. When a single-difference phase observation is formed by subtracting the carrier (or code) phase φ measured by one tracking device with that measured by another tracking device for the same GNSS satellite, the portion of the phase due to receiver 321's clock error is essentially eliminated in the difference. Thereafter, all that remains of the single-difference clock error is a small, nearly constant bias that is due to different effective RF path lengths (possibly resulting from different cable lengths, slightly different filter group-delays, and the like). Consequently, the clock error may be estimated infrequently compared to other more important quantities such as heading, pitch, or roll. During the times that the clock error is not estimated, attitude determining system 390 can produce an output using one fewer GNSS satellites than a system that must continually estimate clock error. Or, if a Kalman filter is utilized, the process noise for the clock state may be lowered substantially, allowing the Kalman filter to strengthen its estimate of the other states such as the angles of attitude. Finally, cycle slips are easier to detect since clock jumps can be ruled out.

Referring again to FIG. 6, selected pairs of antennas are grouped together so that GNSS satellite signal code or carrier phase differences Δ of GNSS satellite signals received by each of the two antennas of the pair may be computed. A GNSS satellite signal code or carrier phase difference Δ (also called phase difference or differential phase) is the difference between the GNSS satellite signal code or carrier phase φ value of a specific GNSS satellite signal measured at a first antenna, and the GNSS satellite signal code or carrier phase φ value of the same GNSS satellite signal measured at a second antenna. For example, in FIG. 6, the pairs AB, AC and BC are possible combinations of antenna pairs from which to compute phase differences Δ.

Figure 8:
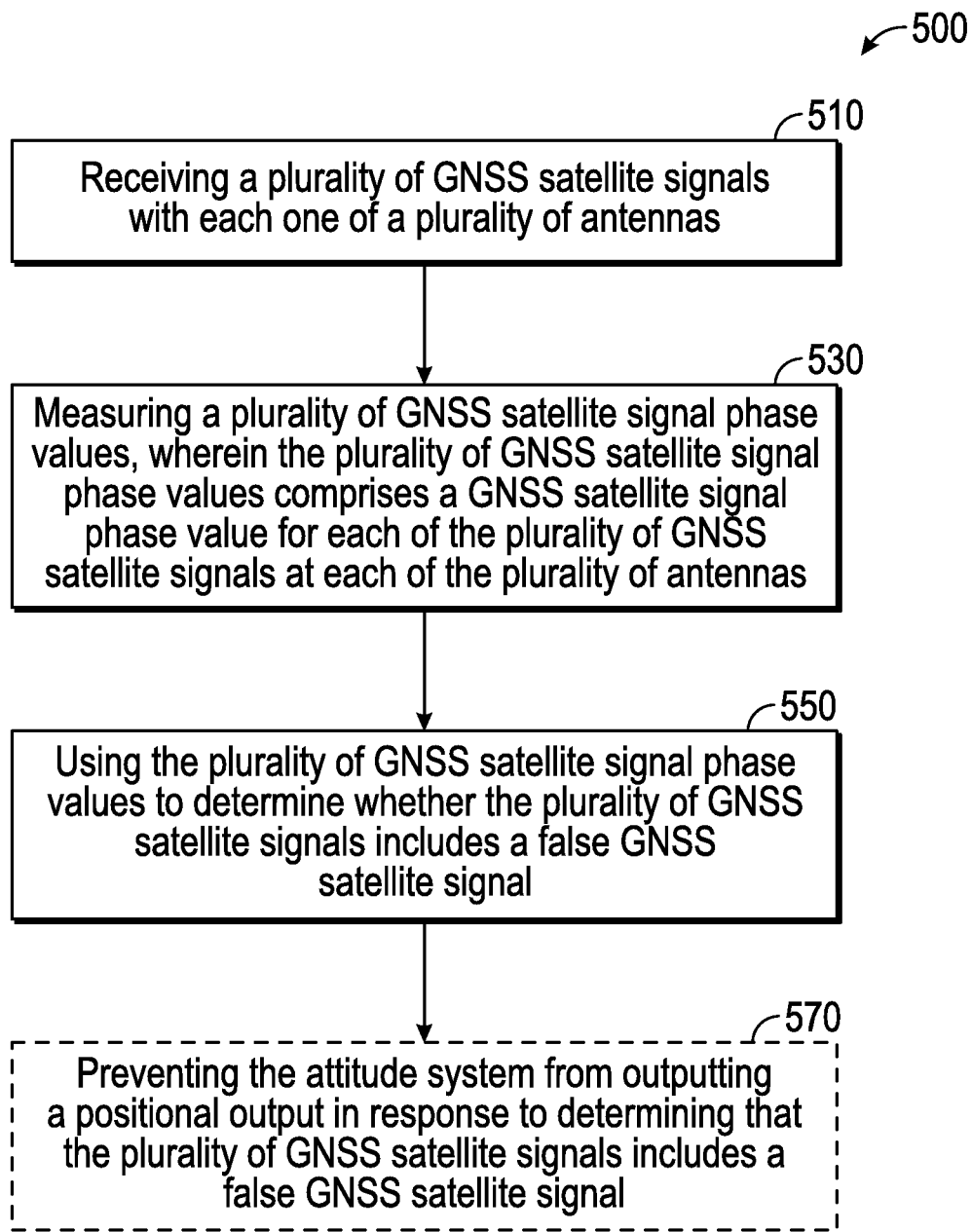
FIG. 8 shows a flow chart of method 500 of detecting false GNSS satellite signals according to an embodiment of the invention.
Figure 9:
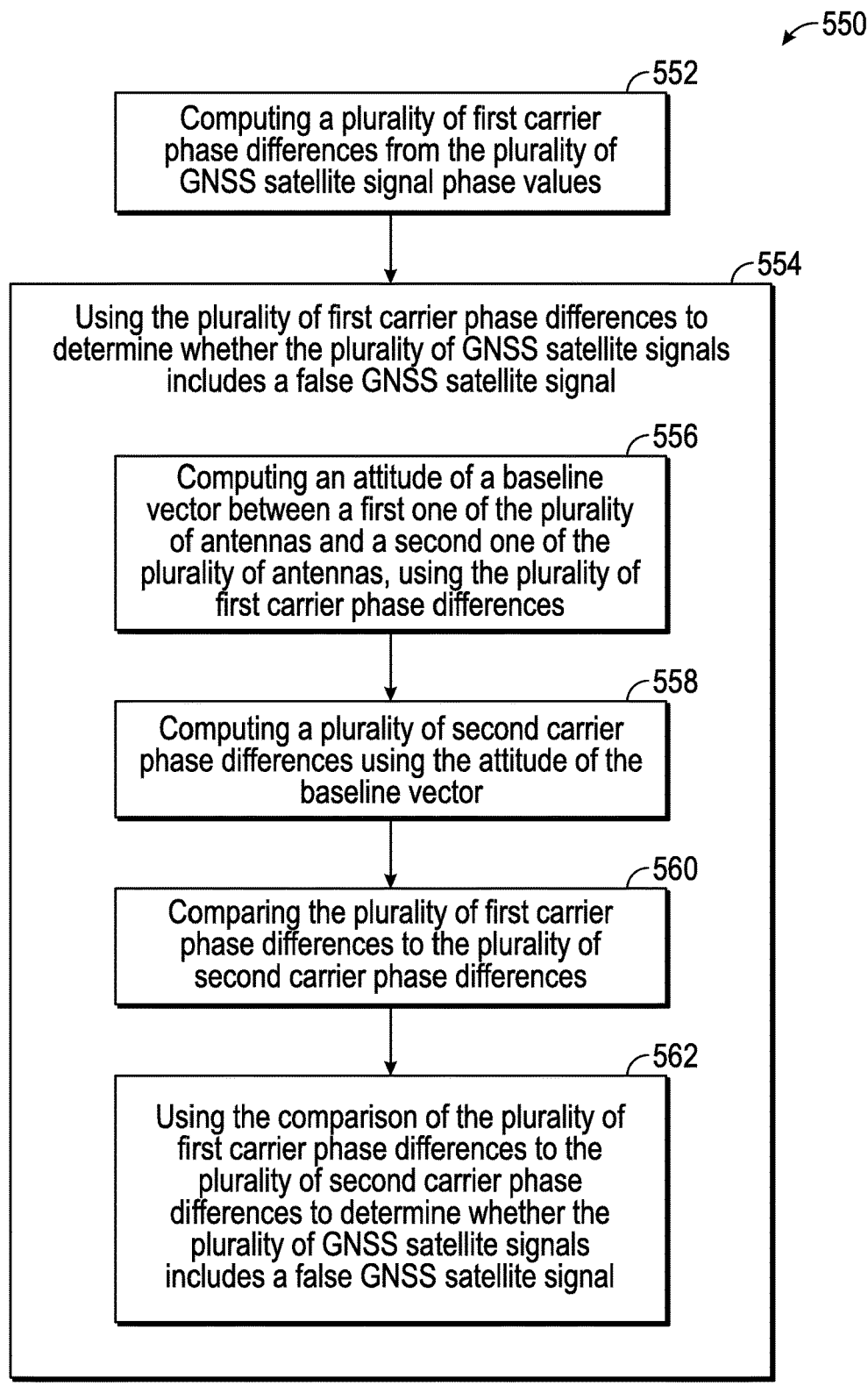
FIG. 9 shows a flow chart of one embodiment of element 550 of method 500.
Figure 10:
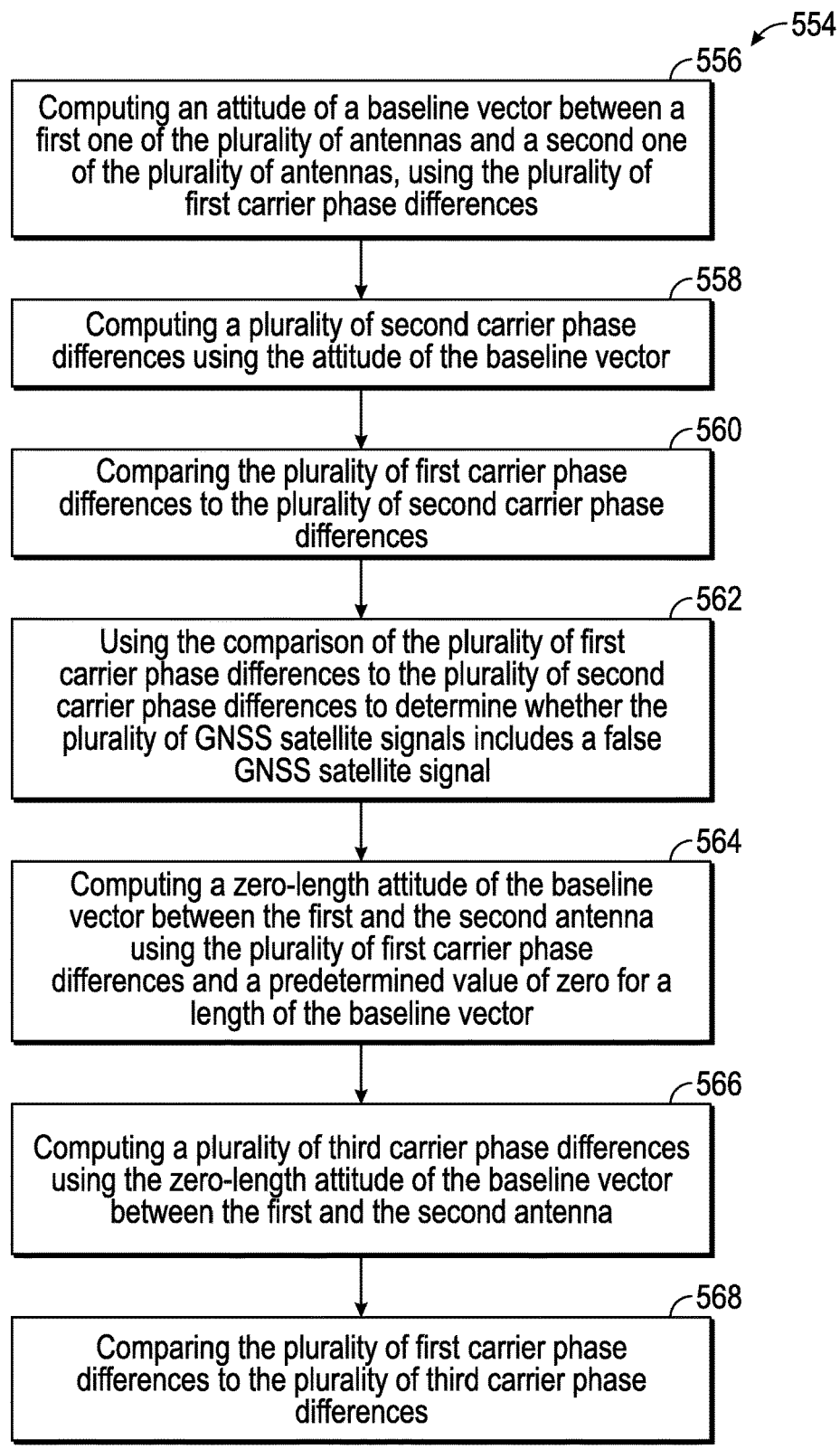
FIG. 10 shows a flow chart of one embodiment of element 554 of element 550.

Attitude determining system 390 as shown in FIG. 6 and FIG. 7 uses measurements of carrier phase φ values and computations of carrier phase differences Δ to detect false GNSS satellite signals. It is to be understood that code phase values and differences can be used in place of carrier phase values and differences in the computations described for attitude determining system 390. Carrier phase measurements are used in these embodiments because the carrier signal component has a higher precision than the code signal components, and therefore results in more precise location and attitude computations. FIG. 8 through FIG. 10 illustrate embodiments of method 500 of detecting false GNSS satellite signals. FIG. 11 through FIG. 16 and the corresponding discussion show and describe the various elements included in the embodiments of method 500 shown in FIG. 8 through FIG. 10. In some embodiments of the invention, a GNSS attitude system such as system 390 is used to perform method 500. In some embodiments a two-antenna system such as system 190 shown in FIG. 3 is used to perform method 500 of detecting false GNSS satellite signals. In some embodiments the system for using method 500 of detecting false GNSS satellite systems includes at least a first antenna, a second antenna, and a receiver. The first and the second antenna receive a plurality of GNSS satellite signals. The receiver is electrically connected to the first and the second antenna, and receives the plurality of GNSS satellite signals received by each of the first and the second antenna. The receiver executes the elements included in the various embodiments of method 500 as illustrated in FIG. 8 through FIG. 10 and described below. The description below illustrates and describes how GNSS attitude determining system 390 of FIG. 6 through FIG. 7 and FIG. 11 through FIG. 16 is used to perform embodiments of method 500 to detect false GNSS satellite signals.

FIG. 8 illustrates one embodiment of method 500 of using a GNSS attitude system to detect false GNSS satellite signals. Method 500 includes element 510 of receiving a plurality of GNSS satellite signals with each one of a plurality of antennas. In some embodiments each of the plurality of antennas belongs to the GNSS attitude system. In the embodiment shown in FIG. 6 and FIG. 7, GNSS attitude determining system 390 is performing method 500. In this embodiment the plurality of GNSS satellite signals includes GNSS satellite signals 306, 307, and 308 from GNSS satellites 303, 304, and 305 respectively. The plurality of antennas includes first antenna 301, second antenna 322, and third antenna 324. Each one of the plurality of antennas 301, 322, and 324 receives each one of the plurality of GNSS satellite signals 306, 307, and 308.

In some embodiments method 500 includes element 530 of measuring a plurality of GNSS satellite signal code or carrier phase φ values. Receiver 321 of attitude determining system 390 executes element 530 of measuring a plurality of GNSS satellite signal code or carrier phase φ values in the embodiment shown in FIG. 6 and FIG. 7. Each GNSS satellite signal code or carrier phase φ value is a GNSS satellite signal code or carrier phase φ value for each one of the plurality of GNSS satellite signals 306, 307, and 308 at each one of the plurality of antennas 301, 322, and 324. In the embodiment of system 390 shown in the figures and in the description below, system 390 is measuring GNSS satellite signal carrier phase φ values. Carrier phase φ values are used by attitude system 390 because the carrier signal component has a wavelength that is small as compared to the code length and therefore provides greater accuracy in range, location, and attitude calculations. It is to be understood that code phase measurements can be used in place of carrier phase measurements in the calculations.

Figure 11:
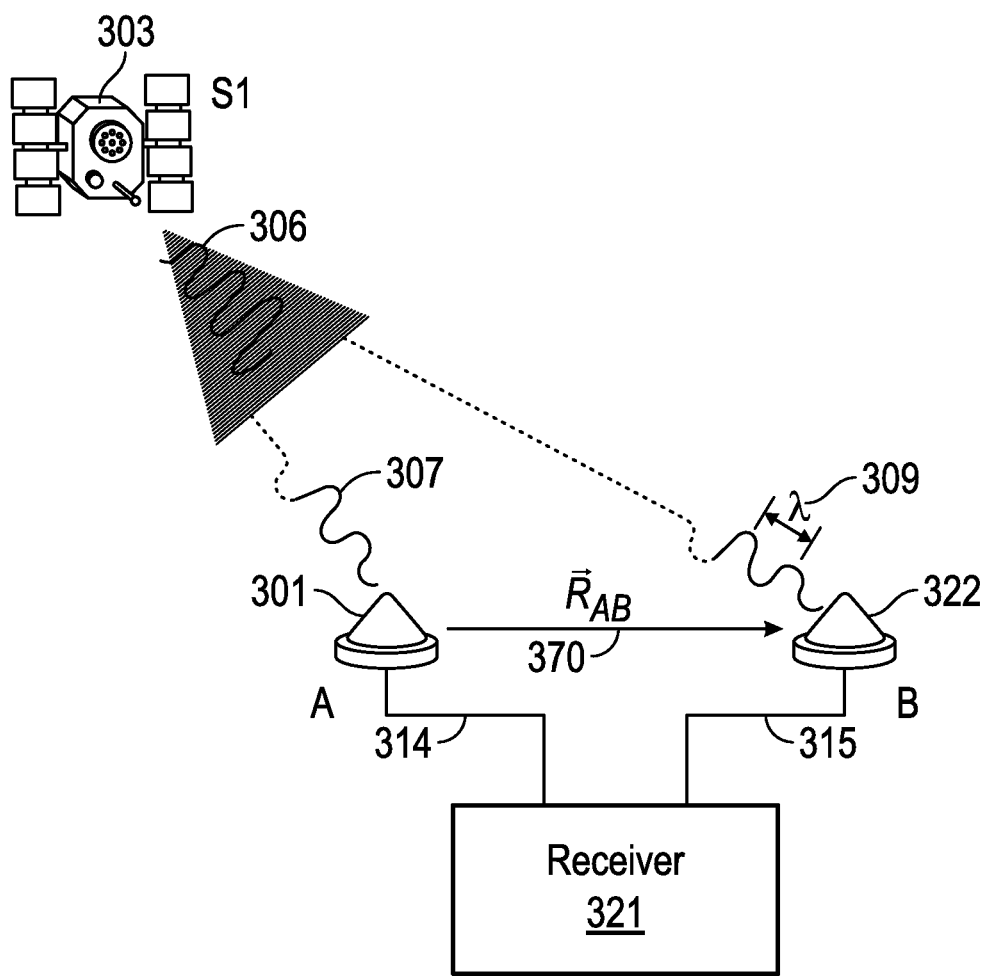
FIG. 11 depicts the reception of a GNSS satellite signal by a first and a second antenna.

FIG. 11 illustrates elements of the measurement of carrier phase φ values for a GNSS satellite signal. FIG. 11 shows a portion of system 390 of FIG. 6 and FIG. 7, including GNSS satellite 303, also referred to as satellite S1, first antenna 301, second antenna 322 and receiver 321. The remaining items included in the plurality of GNSS satellites and the plurality of antennas of FIG. 6 and FIG. 7 have been left out of FIG. 11 for simplicity. FIG. 11 depicts the reception of GNSS satellite signal 306 containing a carrier 307 component by antennas 301 and 322 of attitude determining system 390 of FIG. 6 and FIG. 7, where GNSS satellite signal 306 is then routed from each antenna to receiver unit 321. First antenna 301 and second antenna 322 receive GNSS satellite signal 306 from GNSS satellite 303 S1. GNSS satellite signal 306 received at each antenna 301 and 322 is routed via cables 314 and 315 to receiver unit 321. Receiver unit 321 tracks GNSS satellite signal 306 using tracking devices 202 and 203 associated with antennas 301 and 322 (FIG. 7). Code and carrier phase φ measurements of GNSS satellite signal 306 are made at regular intervals. Of particular importance to some embodiments of this invention is the phase φ of the carrier 307 of GNSS satellite signal 306, which is related to the range to the satellite by the carrier's wavelength λ 309. The carrier phase φ is the measure of the particular point in the wavelength cycle that the GNSS satellite signal is at when it reaches an antenna. The range to GNSS satellite 303 may be expressed in terms of the number of carrier wavelengths λ 309 that will divide it. For GPS satellites, carrier wavelength λ 309 is approximately 19 cm for the L1 carrier and 24 cm for the L2 carrier. The tracking loops within receiver 321 typically track the carrier phase φ to an accuracy of less than three percent of the carrier's wavelength λ. This equates to 5 mm or less when tracking the L1 carrier signal in the GPS form of GNSS. The carrier phase value of GNSS satellite signal 306 as measured at first antenna 301 is designated $\varphi_A^{S1}$, and the carrier phase value of GNSS satellite signal 306 as measured at second antenna 322 is designated $\varphi_B^{S1}$. The naming convention used herein for carrier phase φ is such that the S1 superscript designates the satellite that originated the GNSS satellite signal that is having its phase measured, and the subscript designates the location of the antenna at which the carrier phase φ is measured.

Element 530 of measuring a plurality of GNSS satellite signal code or carrier phase φ values according to embodiments of the invention can include many other elements. Element 530 of measuring a plurality of GNSS satellite signal code or carrier phase φ values can be performed by any method known in the art now or discovered in the future for measuring GNSS satellite signal code or carrier phase φ values of GNSS satellite signals.

The embodiment of method 500 shown in FIG. 8 also includes element 550 of using the plurality of GNSS satellite signal code or carrier phase φ values to determine whether the plurality of GNSS satellite signals 306, 307, and 308 includes a false GNSS satellite signal. Element 550 is executed by receiver 321 in the embodiment shown in FIG. 6 and FIG. 7. The measured GNSS satellite signal code or carrier phase φ values can be used in any number of ways to determine whether the plurality of GNSS satellite signals 306, 307, and 308 comprises one or more than one false GNSS satellite signal. Several of these ways are described below. In some embodiments the GNSS satellite signal code or carrier phase φ values are used to measure ranges and GNSS locations of the plurality of antennas as explained earlier with respect to FIG. 3 and FIG. 4. FIG. 9 and FIG. 10, which are to be discussed shortly, show and describe a number of further embodiments of element 550 of method 500 as shown in FIG. 8.

Method 500 of using a GNSS attitude system to detect false GNSS satellite signals can include many other elements. In some embodiments method 500 includes element 570 of preventing the attitude system from outputting a positional output in response to determining that the plurality of GNSS satellite signals includes a false GNSS satellite signal. This element is shown in dotted lines in FIG. 8 because it is optional in method 500 of FIG. 8. In some embodiments the system for detecting false GNSS satellite signals such as attitude determining system 190 or 390 described in this document provides a warning once false GNSS satellite signals are detected. In other embodiments the system for detecting false GNSS satellite signals such as attitude determining system 190 or 390 described in this document excludes the detected false GNSS satellite signals from the location calculation. Element 570 includes any elements or steps performed, or executed, to provide a warning or to prevent the attitude system from outputting false navigational data. The false navigational data could allow the false GNSS satellite signals to take over navigation of a vehicle, for example. In some embodiments element 570 includes preventing locational data from being output from attitude determining system 390. In some embodiments element 570 includes preventing attitude data from being output from attitude determining system 390. In some embodiments element 570 includes preventing range data from being output from attitude determining system 390. In some embodiments element 570 includes preventing a National Marine Electronics Association (NMEA) output message such as the NMEA GPGGA output message from being delivered from attitude determining system 390. Preventing the attitude system from providing navigational data such as range, location, and attitude will prevent the false GNSS satellite signals from taking control of the equipment that is using the attitude system. In some embodiments method 500 includes outputting a warning signal in response to detecting false GNSS satellite signals. In some embodiments method 500 includes excluding false GNSS satellite signals from computations such as location, attitude, or time. In some embodiments method 500 includes excluding a particular type of GNSS satellite signals (GPS, GLONASS, BDS) from computations in response to detecting a false GNSS satellite signal of the particular type. For example. If a GPS satellite signal is detected to be false, the attitude system can use GLONASS satellite signals for computations, excluding the GPS signals.

Several embodiments of element 550 of using the plurality of GNSS satellite code or carrier phase φ values to determine whether the plurality of GNSS satellite signals comprise a false GNSS satellite signal are shown in FIG. 9 and FIG. 10 and described below. FIG. 9 shows embodiments of element 550, including two embodiments of element 554 of element 550. FIG. 10 shows a further embodiment of element 554 of element 550.

Element 550 of FIG. 9 includes element 552 of computing a plurality of first carrier phase differences $\Delta_1$ from the plurality of carrier phase φ values. In some embodiments code phase values are measured instead of carrier phase φ values, and code phase differences computed instead of carrier phase φ differences. It is to be understood that code phase values and differences can be used in place of carrier phase values and differences by attitude system 390. In this document the first carrier phase difference is designated as $\Delta_1$, and is defined as the difference between the measured carrier phase φ of a specific one of the plurality of GNSS satellite signals at a first antenna (A) and the measured carrier phase φ of that same specific one of the plurality of GNSS satellite signals at a second antenna (B), and is given by:

$$\Delta_1 = \varphi_B^S - \varphi_A^S, \quad (1)$$

where $\varphi_B^S$ is the measured carrier phase of the GNSS satellite signal originating at satellite S and having its carrier phase measured at antenna B, and $\varphi_A^S$ is the measured carrier phase of the same GNSS satellite signal originating at satellite S but having is carrier phase measured at antenna A. First carrier phase difference $\Delta_1$ in this embodiment is a measured carrier phase difference because it is determined from the measured carrier phase φ values. This is in contrast with the second estimated carrier phase difference $\Delta_2$ to be discussed shortly, which is an estimated carrier phase difference value computed based on geometric considerations.

Equation 1 provides one method of executing element 552 of FIG. 9 of computing a plurality of first carrier phase differences $\Delta_1$ from the plurality of carrier phase φ values. Once a plurality of carrier phase φ values are measured by receiver 321 of system 390 for a plurality of GNSS satellite signals at a plurality of antennas (element 530), the first carrier phase differences $\Delta_1$ are computed according to Equation 1 and element 552 of method 500. First carrier phase differences $\Delta_1$ are determined for each antenna pair and for each GNSS satellite signal. These first carrier phase differences $\Delta_1$ are then used to determine whether the plurality of GNSS satellite signals includes false GNSS satellite signals, as detailed as element 554 in FIG. 9 and FIG. 10. Thus in some embodiments computing a plurality of first carrier phase differences includes subtracting a measured carrier phase φ value of each individual one of the plurality of satellite signals as received at a first one of the plurality of antennas from a corresponding measured carrier phase φ value of each individual one of the plurality of satellite signals as received at a second one of the plurality of antennas.

Element 550 of method 500 in the embodiment shown in FIG. 9 includes element 554 of using the plurality of first carrier phase differences $\Delta_1$ to determine whether the plurality of GNSS satellite signals includes a false GNSS satellite signal. The first carrier phase differences $\Delta_1$ can be used in many ways to determine whether the plurality of GNSS satellite signals includes a false GNSS satellite signal. Described below are the details of a number of example steps, elements, methods, and computations for executing element 554 of using the plurality of first carrier phase differences $\Delta_1$ to determine whether the plurality of GNSS satellite signals includes a false GNSS satellite signal using attitude determining system 390 of FIG. 6, and FIG. 7. These embodiments of element 554 include computations of the attitude of a baseline vector connecting two of the antennas (element 556 and element 564 to be described shortly), and the computation of second estimated carrier phase differences $\Delta_2$ (element 558 and 566 to be described shortly). The results of these computations using the plurality of carrier phase φ values and the plurality of first carrier phase differences $\Delta_1$ are used to determine whether the plurality of GNSS satellite signals include a false GNSS satellite signal.

Embodiments of element 554 of method 500 of detecting false GNSS satellite signals as shown in FIG. 9 and FIG. 10, and as used by system 390 rely on determining both a measured and an estimated carrier phase difference $\Delta$ value, and then comparing the measured and the estimated carrier phase difference $\Delta$ values to determine whether system 390 is receiving false GNSS satellite signals. System 390 according to embodiments of the invention computes a first measured carrier phase difference $\Delta_1$, and a second estimated carrier phase difference $\Delta_2$. Computation of the first carrier phase difference $\Delta_1$ comprise element 552 as described above according to Equation 1. Computation of the second carrier phase difference $\Delta_2$ comprise element 558 shown in FIG. 9 and FIG. 10 and will be discussed in further detail shortly. As mentioned earlier, first carrier phase difference $\Delta_1$ is in this embodiment a measured carrier phase difference, computed from measured carrier phase $\varphi$ values using Equation 1. Second carrier phase difference $\Delta_2$ is an estimated value based on the assumed geometry of the GNSS satellites and the antennas. In a normal—non-spoofed GNSS system it is expected that the estimated second carrier phase difference $\Delta_2$ will match the measured first carrier phase difference $\Delta_1$. The residual error is the difference between first measured carrier phase difference $\Delta_1$ and second estimated carrier phase difference $\Delta_2$, in other words the residual error is the difference between the measured and the estimated calculations of carrier phase difference $\Delta$. When false GNSS satellite signals are present, the two values $\Delta_1$ and $\Delta_2$ will not agree. Thus false GNSS satellite signals can be detected by comparing the two carrier phase differences $\Delta_1$ and $\Delta_2$, because the residual error or amount of difference between the two carrier phase difference values $\Delta_1$ and $\Delta_2$ will often be large when false GNSS satellite signals are received. When false GNSS satellite signals are not present, the two values $\Delta_1$ and $\Delta_2$ will often match with little residual error. The mismatch of first measured carrier phase difference $\Delta_1$ values and second estimated carrier phase difference $\Delta_2$ values is the basis of some embodiments of element 554 of method 500 of detecting false GNSS satellite signals according to the invention. In some embodiments a third carrier phase difference $\Delta_3$—another estimated value—is computed and compared to the first and second carrier phase differences $\Delta_1$ and $\Delta_2$. Computation and use of third carrier phase difference $\Delta_3$ comprises elements 566 and 568 of element 554 of FIG. 10 and will be discussed shortly.

Figure 12:
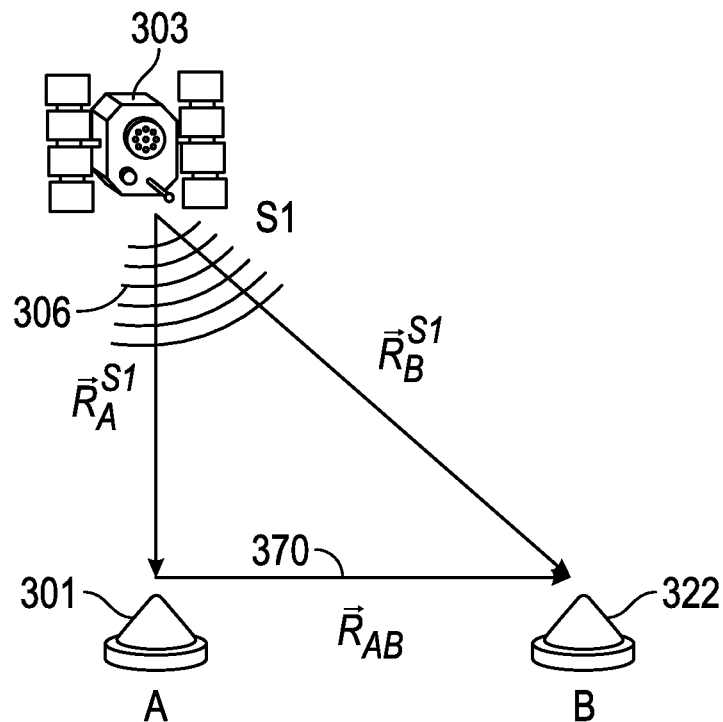
FIG. 12 shows range vectors extending from a satellite to a first and a second antenna, and a baseline vector extending between the first and the second antenna.
Figure 13:
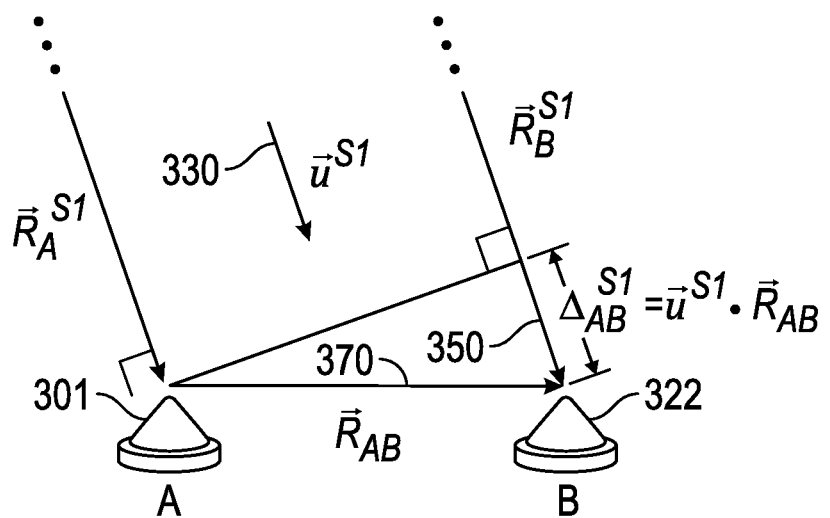
FIG. 13 shows the system of FIG. 12 with a geometry consistent with its use in a GNSS.

Element 554 of FIG. 9 includes element 556 of computing an attitude of a baseline vector between a first one of the plurality of antennas and a second one of a plurality of antennas using the plurality of first carrier phase differences $\Delta_1$. The attitude of the baseline vector is used to compute the second carrier phase difference $\Delta_2$. FIG. 12 through FIG. 15 illustrate elements important to the computation of the attitude of a baseline vector and the computation of the second carrier phase difference $\Delta_2$. FIG. 12 and FIG. 13 show components of attitude determining system 390 for detecting false GNSS satellite systems of FIG. 6, FIG. 7, and FIG. 11, with some of the components not shown for simplicity. FIG. 12 and FIG. 13 show first and second antennas 301 and 322 of FIG. 6, FIG. 7, and FIG. 11 located at points A and B. Antennas 301 and 322 each receive GNSS satellite signal 306 from GNSS satellite 303 S1. Range vector $\vec{R}_A^{S1}$ extends from satellite 303 (S1) to antenna 301 at point A. The range vector naming convention used herein is such that the superscript designates the satellite that the vector extends from, and the subscript designates the antenna that the vector extends to. Therefore range vector $\vec{R}_A^{S1}$ extends from satellite S1 (303) to antenna 301 at point A. Range vector $\vec{R}_B^{S1}$ extends from satellite S1 (303) to antenna 322 at point B. Vector $\vec{R}_{AB}$ extends between first antenna 301 and second antenna 322, joining points A and B. Any vector, such as vector $\vec{R}_{AB}$, that joins two antennas will be termed a baseline vector. For the purpose of illustration, in FIG. 12, baseline vector $\vec{R}_{AB}$, also denoted as 370 in the figures, is shown significantly large relative to the distance to satellite 303. FIG. 13 depicts the scenario that is more diagrammatically and geometrically accurate, where satellite 303 S1 (not shown in FIG. 13) is significantly far away relative to the length of $\vec{R}_{AB}$, so that range vectors $\vec{R}_A^{S1}$ and $\vec{R}_B^{S1}$ are essentially parallel.

The difference in the length of range vector $\vec{R}_A^{S1}$ and the length of range vector $\vec{R}_B^{S1}$ is a value that is equivalent to the carrier phase difference $\Delta_1$ of a GNSS satellite signal that is being received by both antenna 301 A and antenna 322 B. Thus in the system shown in FIG. 12 and FIG. 13, the difference in the length of range vector $\vec{R}_A^{S1}$ and the length of range vector $\vec{R}_B^{S1}$ can be used to estimate the carrier phase difference $\Delta_1$ between the carrier phase $\varphi$ value of GNSS satellite signal 306 from GNSS satellite 303 (S1) as received at second antenna 322 ($\varphi_B^{S1}$) and the carrier phase $\varphi$ of signal 306 as received at first antenna 301 ($\varphi_A^{S1}$), and is defined as the geometric or estimated carrier phase difference $\Delta_{AB}^{S1}$, as shown in FIG. 13 denoted as 350. The naming convention used herein for geometric or estimated carrier phase difference is such that the S1 superscript designates the satellite that originated the GNSS satellite signal that is having its phase difference $\Delta$ estimated, and the AB subscript designates the antennas that are receiving the GNSS satellite signal.

Figure 14:
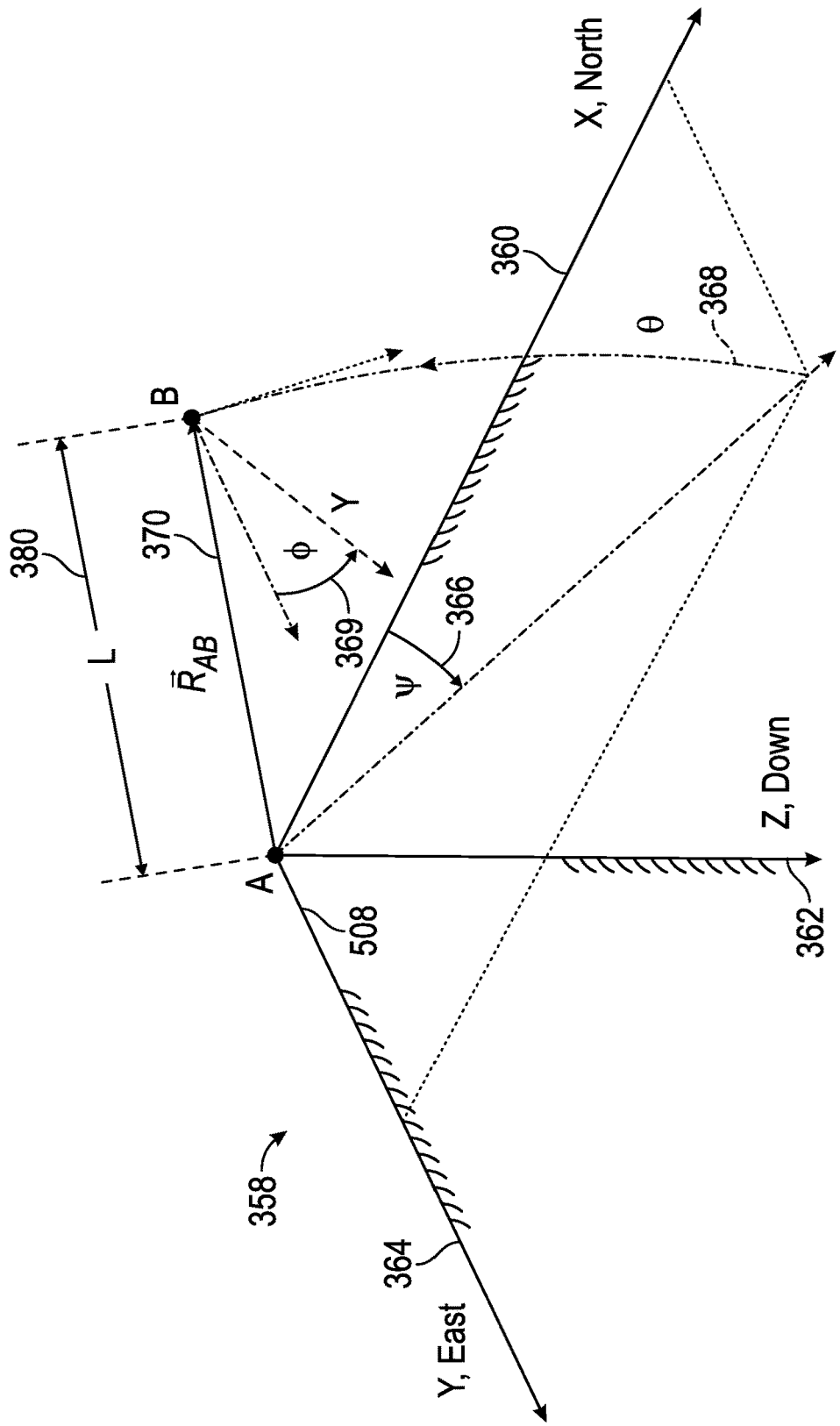
FIG. 14 illustrates three angles yaw, pitch and roll that can be used in attitude determination of an object.

Attitude systems such as attitude determining system 390 routinely compute the attitude, or orientation of an object's axes relative to a reference system, based on the computed GNSS location of two or more receiving antennas such as antenna 310 at location A and antenna 322 at location B shown in FIG. 13. FIG. 14 illustrates baseline vector 370 $\vec{R}_{AB}$ relative to earth base reference system 358. It is to be understood that often the attitude of objects is computed relative to a body-fixed reference system that is different than the earth-base reference system 358 shown, but the transformation from one reference system to another is a standard computation. Earth-base reference system 358 shown in FIG. 14 includes X axis 360 which points North, Y axis 364 which points East, and Z axis 362 which points down, towards the center of the earth. The attitude of baseline vector 370 $\vec{R}_{AB}$ can be defined using yaw angle $\psi$ 366, also known as heading, or azimuth angle, pitch angle $\theta$ 368, roll angle $\phi$ 369, and length L 380. With a two-dimensional object only two angles are needed, pitch angle $\theta$ 368 and roll angle $\phi$ 369. In many attitude determining systems length L 380 of baseline vector 370 $\vec{R}_{AB}$ is known because it is the distance between the two antennas 301 and 322, which is known or can be determined. Thus in some embodiments the computation of the attitude of the baseline vector includes computing the attitude of the baseline vector using a predetermined length of the baseline vector, where the predetermined length is the distance between the two antennas defining the baseline vector. The fewer the elements to be determined computationally, the fewer the number of equations that are needed to solve, and the more robust the computation. The computation of attitude of baseline vectors is routinely performed by GNSS attitude systems such as system 390. Method 500 takes advantage of this capability of attitude determining systems, and applies it to the problem of detecting false GNSS satellite signals. Details of the computation of the attitude of a baseline vector is described in more detail in U.S. Pat. No. 7,292,185 to Whitehead, et al, which the contents thereof are incorporated entirely herein by reference. It is to be understood that other angles and variables can be used to specify the attitude of a vector.

The estimated, or geometrically defined, carrier phase difference $\Delta_{AB}{}^{S1}$ 350 as described earlier is defined based on geometric considerations as shown in FIG. 13. This geometric carrier phase difference $\Delta_{AB}{}^{S1}$ 350 is in general the dot product of a unit vector from a GNSS satellite and the baseline vector $\vec{R}_{AB}$ between the two antennas at location A and B that are receiving the GNSS satellite signal, given by:

$$\Delta_{AB}{}^{S1} = \vec{\mu}^{S1} \cdot \vec{R}_{AB} \tag{2}$$

where $\vec{\mu}^{S1}$ is the unit vector from satellite 303 S1 (denoted 330 in FIG. 13) and $\vec{R}_{AB}$ is the baseline vector 370 from antenna 301 at location A and antenna 322 at location B. The geometric carrier phase difference $\Delta_{AB}{}^{S1}$ is an estimated value for the measured carrier phase difference $\Delta_1$ as determine by equation 1. Substituting equation 2 into Equation 1 gives Equation 3:

$$\Delta_1 \approx \Delta_{AB}{}^{S1} = \vec{\mu}^{S1} \cdot \vec{R}_{AB}. \tag{3}$$

Figure 15:
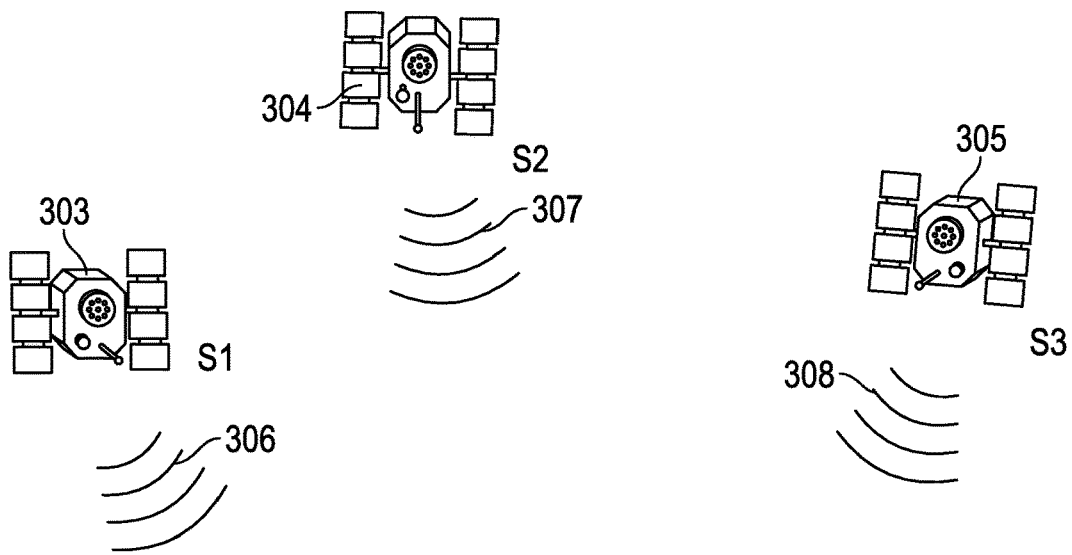
FIG. 15 illustrates geometrically the range vectors and phase differences of three GNSS satellite signals being received by a first and a second antenna.
Figure 15:
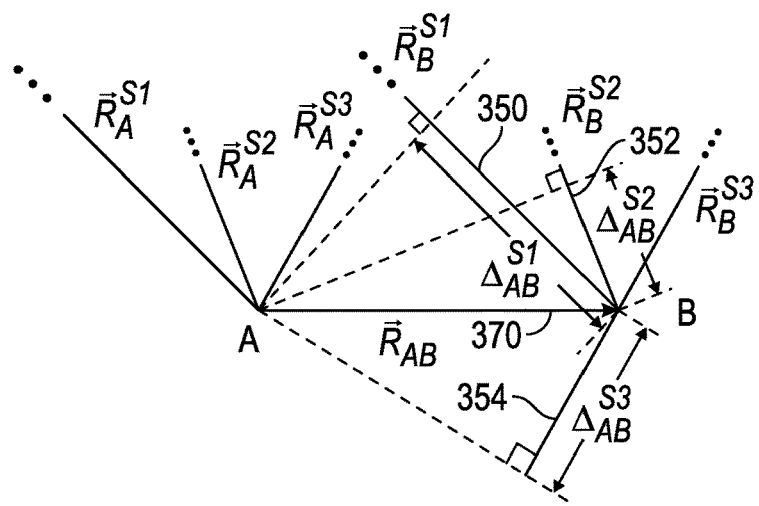

Equation 3 is used by attitude determining system 390 to execute element 556, solving for baseline vector $\vec{R}_{AB}$ using multiple measurements of first carrier phase differences $\Delta_1$ from multiple satellites. This is illustrated in FIG. 15. Unit vector $\vec{\mu}^{S1}$ 330 is determined by attitude determining system 390 using the known location of the originating satellite and the receiving antenna, as is known in the art of attitude determination. FIG. 15 shows the locations A and B of first and second antenna 301 and 322 of attitude system 390 of FIG. 6 and FIG. 7 and FIG. 11 through FIG. 13. Antennas 301 and 322 are not shown for simplicity of FIG. 13. Shown also are the three GNSS satellites 303 (S1), 304 (S2), and 305 (S3) of FIG. 6 and FIG. 7 and FIG. 11 through FIG. 13, the range vectors extending from each of GNSS satellites 303, 304, and 305 and locations A of first antenna 301 and location B of second antenna 322. GNSS satellites 303, 304, and 305 are broadcasting GNSS satellite signals 306, 307, and 308 respectively as shown previously in FIG. 6. Range vectors $\vec{R}_A{}^{S1}$ and $\vec{R}_B{}^{S1}$ are the range vectors from satellite 303 (S1) to locations A and B respectively. Range vectors $\vec{R}_A{}^{S2}$ and $\vec{R}_B{}^{S2}$ are the range vectors from satellite 304 (S2) to locations A and B respectively. Range vectors $\vec{R}_A{}^{S3}$ and $\vec{R}_B{}^{S3}$ are the range vectors from satellite 305 (S3) to locations A and B respectively. The estimated geometric carrier phase differences for each of the GNSS satellite signals 303, 304, and 305 as received by each of the first and the second antenna 301 and 302 are shown as $\Delta_{AB}{}^{S1}$ 350, $\Delta_{AB}{}^{S2}$ 352 and $\Delta_{AB}{}^{S3}$ 354 respectively.

Attitude determining system 390 executes element 556 in some embodiments by creating an Equation 3 for each GNSS satellite signal and each baseline vector, then using the multiple equations to solve for the attitude of the baseline vector. Algebraic least-squares method or Kalman filter methods may be used to solve for the attitude of the baseline vector using the measured first carrier phase differences $\Delta_1$. Attitude determining systems such as attitude determining system 390 of embodiments of the invention routinely perform calculations of the attitude of unit vectors and baseline vectors, as mentioned earlier. Further details about the calculation of unit vectors and baseline vectors can be found in U.S. Pat. No. 7,292,185 to Whitehead.

For the system shown in FIG. 13, the set of equations to be solved would be given by:

$$\Delta_{AB}{}^{S1} = \vec{\mu}_A{}^{S1} \cdot \vec{R}_{AB}, \tag{4}$$

$$\Delta_{AB}{}^{S2} = \vec{\mu}_A{}^{S2} \cdot \vec{R}_{AB}, \tag{5}$$

and $$\Delta_{AB}{}^{S3} = \vec{\mu}_A{}^{S3} \cdot \vec{R}_{AB}, \tag{6}$$

where $\Delta_{AB}{}^{S1}$, $\Delta_{AB}{}^{S2}$, and $\Delta_{AB}{}^{S3}$ are the measured first carrier phase differences $\Delta_1$ computed using equation 1 and the measured carrier phase $\varphi$ values of GNSS satellite signals 306 (from satellite 303 S1), 307 (from satellite 304 S2), and 308 (from satellite 305 S3) measured at antenna 301 A and 322 B. These three equations are simultaneously solved to determine the attitude of the baseline vector $\vec{R}_{AB}$ 370. It is to be understood that in some embodiments more GNSS satellite signals are used, which provide a greater number of measured first carrier phase difference $\Delta_1$ values. Often, the greater the number of equations that are solved simultaneously, the greater the resulting accuracy of the calculation of the attitude of baseline vector $\vec{R}_{AB}$. In some embodiments the attitude of a second baseline vector is computed, where the second baseline vector extends between a first one of the plurality of antennas and a third one of the plurality of antennas. For attitude system 390 of FIG. 6, the second baseline vector extending between a first one of the plurality of antennas and a third one of the plurality of antennas is baseline vector $\vec{R}_{AC}$ 372 between antenna A 301 and antenna 324 at location C, for example.

In this way the plurality of first carrier phase differences $\Delta_1$ are used to perform element 556 of computing an attitude of a baseline vector between a first one of the plurality of antennas and a second one of the plurality of antennas. Element 556 is one of the elements that comprise element 554 in the embodiment of element 550 as shown in FIG. 9 and FIG. 10, and element 550 is one of the elements of method 500 according to embodiments of the invention of FIG. 8.

The next step in element 554 of using the plurality of first carrier phase differences $\Delta_1$ to determine whether the plurality of GNSS satellite signals comprises a false GNSS satellite signal of element 550 as detailed in FIG. 9, is element 558 of computing a plurality of second carrier phase differences $\Delta_2$ using the attitude of the baseline vector. For each of the first measured carrier phase difference $\Delta_1$ values, a corresponding second, or estimated, carrier phase difference $\Delta_2$ is computed using Equation 2 and the known attitude of the baseline vector and the unit vector from the solution to Equation 3. For the system shown in FIG. 15 the equations would be:

$$\Delta_{AB2}{}^{S1} = \vec{\mu}_A{}^{S1} \cdot \vec{R}_{AB}, \tag{7}$$

$$\Delta_{AB2}{}^{S2} = \vec{\mu}_A{}^{S2} \cdot \vec{R}_{AB}, \tag{8}$$

and $$\Delta_{AB2}{}^{S3} = \vec{\mu}_A{}^{S3} \cdot \vec{R}_{AB}, \tag{9}$$

where $\Delta_{AB2}{}^{S1}$, $\Delta_{AB2}{}^{S2}$ and $\Delta_{AB2}{}^{S3}$ are the second or estimated carrier phase differences $\Delta_2$ values. It is to be understood that in some embodiments there will be more sets of baseline vectors, GNSS satellite signals, and corresponding measurements of carrier phase differences $\Delta_1$ and $\Delta_2$. In general computing a plurality of second carrier phase differences $\Delta_2$ using the attitude of the baseline vector extending between a first and a second antenna includes computing the dot product of the baseline vector extending between the first and the second antenna and each one of a plurality of unit vectors, wherein each of the plurality of unit vectors corresponds to each of a corresponding one of the plurality of GNSS satellites and GNSS satellite signals. The result is a set of second, or geometric, carrier phase differences $\Delta_2$. The second carrier phase differences $\Delta_2$ are computed based on the assumed geometry of the system, the GNSS satellite locations and the attitude of the baseline vector $\vec{R}_{AB}$. One of skill in the art will recognize that the calculation of first and second carrier phase differences is an iterative process which can be repeated to minimize error in the calculations, which will increase the reliability of the detection of false GNSS satellite signals.

Step 560 of element 554 as shown in FIG. 9 includes comparing the plurality of second estimated geometric carrier phase differences $\Delta_2$ to the first measured carrier phase differences $\Delta_1$. There are many ways that the first carrier phase differences $\Delta_1$ and the second carrier phase differences $\Delta_2$ can be compared to each other. In some embodiments the corresponding first and second carrier phase differences $\Delta_1$ and $\Delta_2$ are differenced and the differences squared and averaged or summed. In some embodiments this element involves subtracting the first carrier phase difference $\Delta_1$ for each one of the plurality of GNSS satellite signals from the second carrier phase difference $\Delta_2$ for the corresponding same one of the plurality of GNSS satellite signals. In some embodiments a residual error value is computed using the differences between the first and second carrier phase differences $\Delta_1$ and $\Delta_2$. In some embodiments the first carrier phase differences $\Delta_1$ and the second carrier phase differences $\Delta_2$ are compared in a way that results in a computation of a number or set of numbers that provides a measure of the size of the difference between the first and second carrier phase differences $\Delta_1$ and $\Delta_2$.

Step 562 of element 554 in the embodiment of element 550 shown in FIG. 8 includes using the comparison of the pluralities of first carrier phase differences $\Delta_1$ and second carrier phase difference $\Delta_2$ to determine whether the plurality of GNSS satellite signals includes a false GNSS satellite signal. Under normal operation of a GNSS navigational system, the second estimated or geometric carrier phase differences $\Delta_2$ should match the first or measured carrier phase differences $\Delta_1$ to within some threshold residual error value or margin of error. In some embodiments the computed residual error between the first carrier phase differences $\Delta_1$ and second carrier phase differences $\Delta_2$ can be compared to a threshold residual error value to determine if the difference between the first and second carrier phase differences $\Delta_1$ and $\Delta_2$ are large enough to indicate that the plurality of GNSS satellite signals comprises at least one false GNSS satellite signal. The first and second carrier phase difference $\Delta_1$ and $\Delta_2$ can be compared in any way which allows a determination of whether the differences between the two sets of values is large enough to indicate the presence of false GNSS satellite signals.

Figure 16:
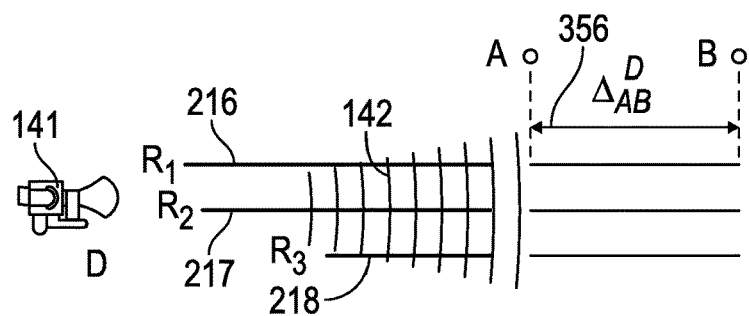
FIG. 16 illustrates the phase differences of a spoofing signal that includes three GNSS satellite signals as received by a first and a second antenna.

The difference between the first carrier phase differences $\Delta_1$ and the second carrier phase differences $\Delta_2$ will be large when there are false GNSS satellite signals present—the attitude system is being spoofed—because each of the false GNSS satellite signals will result in approximately the same first carrier phase difference $\Delta_1$ value for each satellite signal. This will not be the case when the attitude system is receiving real GNSS satellite signals. This is illustrated in FIG. 16. FIG. 16 shows the situation of FIG. 15 except first antenna 301 at location A and second antenna 322 at location B are receiving spoofing signal 142 of FIG. 1 through FIG. 3. Spoofing signal 142 in this embodiment contains three false GNSS satellite signals 116, 117, and 118 which result in range values of R1 (216), R2 (217), and R3 (218) being computed by receiver 321, as shown in the figures. When the carrier phase $\varphi$ of these signals 116, 117, and 118 is measured and differenced, the first measured carrier phase difference values $\Delta_1$ for each different false GNSS satellite signal will be the same value or nearly the same value within the accuracy of the computation, and will not match well with the corresponding second estimated or geometric carrier phase difference value $\Delta_2$, which assumes the satellite signals are originating from the sky where they would be originating from under normal non-spoofing circumstances.

For example and as shown in FIG. 13 through FIG. 16, the signal path length differences between first antenna 301 at location A and second antenna 322 at location B, depend on the angle that the GNSS satellite signal's path makes with respect to the baseline vector $\vec{R}_{AB}$ as can be seen in FIG. 15. Satellites are typically at different points in the sky, and thus make different angles with respect to each baseline vector. In a normal system without false GNSS satellite signals such as shown in FIG. 15, both the first measured carrier phase differences $\Delta_1$ and the second geometric carrier phase differences $\Delta_2$ will be approximately the same value for each GNSS satellite signal, and each GNSS satellite signal will all have different phase difference values, as seen in FIG. 15 by the differing length of $\Delta_{AB}^{S1}$ (350), $\Delta_{AB}^{S2}$ (352) and $\Delta_{AB}^{S3}$ (354). In other words, in a normal non-spoofed system, the second estimated or geometrically computed carrier phase differences $\Delta_2$ will match the first or measured carrier phase differences $\Delta_1$ with little residual error.

When the attitude system is receiving false GNSS satellite signals, however, the first carrier phase differences $\Delta_1$ and the second carrier phase differences $\Delta_2$ will not match each other. The second carrier phase differences $\Delta_2$ will be different values for each GNSS satellite signal, as shown in FIG. 13 as $\Delta_{AB}^{S1}$ (350), $\Delta_{AB}^{S2}$ (352) and $\Delta_{AB}^{S3}$ (354), because attitude determining system 390 assumes the GNSS satellite signals are originating from different satellites in the sky, and will compute different second or geometric carrier phase differences $\Delta_2$ for each GNSS satellite signal. However, the first carrier phase differences $\Delta_1$ will be the same values for each GNSS satellite signal as shown in FIG. 16, and will be equal to the common path length difference $\Delta_{AB}^{D}$ (356) as shown in FIG. 16. The false GNSS satellite signals have the same path length difference, and hence the same first measured carrier phase difference $\Delta_1$ values as measured at each of the antennas at location A and B, because the false GNSS satellite signals are originating from the same transmitter 141. Thus, the residual errors between the first and second carrier phase differences $\Delta_1$ and $\Delta_2$ will be large in this situation. Thus, there will be no solution for the attitude of the baseline vector $\vec{R}_{AB}$ that will result in both small residual error between the first measured and second geometric carrier phase differences $\Delta_1$ and $\Delta_2$ and yield the correct, known baseline distance under spoofing conditions—when false GNSS satellite signals are being received.

This large difference between the first measured and second estimated carrier phase differences $\Delta_1$ and $\Delta_2$ is used in element 562 to determine that attitude determining system 390 is receiving at least one false GNSS satellite signal. When an attitude system such as system 390 is being spoofed with false GNSS satellite signals, the residual error between the first and second carrier phase differences $\Delta_1$ and $\Delta_2$ will be large. The residual error being larger than a threshold residual error value is an indication that false GNSS satellite signals are being received. It will be determined that at least one of the plurality of GNSS satellite signals are false GNSS satellite signals in response to the residual error value being larger than a threshold residual error value.

Thus receiver 321 of system 390 executes a computation resulting in a comparison of the first measured and second estimated carrier phase differences $\Delta_1$ and $\Delta_2$, and makes a determination of whether system 390 is receiving false GNSS satellite signals based on the result of the computation. In some embodiments a residual error is computed based on the differences between the first and second carrier phase differences $\Delta_1$ and $\Delta_2$. System 390 determines that false GNSS satellite signals are being received by system 390 when the residual error between the first and second carrier phase differences $\Delta_1$ and $\Delta_2$ is larger than a predetermined threshold residual error value.

A way to check this determination that the attitude system is receiving false GNSS satellite signals is to solve for the attitude of the baseline vector using a predetermined length L (380 in FIG. 14) of zero for the baseline vector. The solution of this attitude computation is called a zero-length baseline solution. As mentioned earlier, when a system is spoofed, the receiver will compute approximately the same GNSS location for each of the receiving antennas. Setting the length of the baseline vector between two antennas to zero is equivalent to the antennas being in the same location. Therefore, computing the attitude of the baseline vector between two antennas using a length of zero will result in a set of third estimated carrier phase differences $\Delta_3$ that better match the first carrier phase differences $\Delta_1$ that are measured using the false GNSS satellite signals. Here, $\Delta_3$ will be zero, or exhibit a term that is common to all satellite phase differences. The zero baseline solution means that the ranges at both antennas are assumed to be the same (or contain a common clock/delay term), and thus the ranges differences, $\Delta_3$, are zero or share a common value for all spoofed satellite signals.

This technique is embodied in element 554 as shown in FIG. 10. Elements 556, 558, 560 and 562 are as described earlier. Element 564 involves computing the zero-length baseline solution between the first antenna and the second antenna using the plurality of first carrier phase differences and a predetermined value of zero for the length L of the baseline vector. For attitude determining system 390 of FIG. 5 and FIG. 7 zero-length attitude vector $\vec{R}_{AB}{}^{zero}$ will be solved for using Equation 4, 5, and 6 and a value of zero for the length L 380 of attitude vector $\vec{R}_{AB}$. Once the zero-length baseline solution $\vec{R}_{AB}{}^{zero}$ is determined, this solution is used in Equation 7, 8, and 9 to compute a plurality of third estimated carrier phase differences $\Delta_3$.

Element 566 includes computing a plurality of third carrier phase differences $\Delta_3$ using the zero-length baseline solution between the first and the second antenna. For this element the zero-length baseline solution $\vec{R}_{AB}{}^{zero}$ will be used in Equations 7, 8 and 9 above to compute a plurality of third estimated carrier phase differences $\Delta_3$.

Element 568 includes comparing the plurality of first carrier phase differences $\Delta_1$ to the plurality of third carrier phase differences $\Delta_3$. For computations with an attitude system such as attitude determining system 390 that is receiving false GNSS satellite signals, the third carrier phase difference $\Delta_3$ values will match well, with little residual error, to the first carrier phase differences $\Delta_1$. The first and third carrier phase differences $\Delta_1$ and $\Delta_3$ can be compared using any number of computations. In some embodiments element 568 includes computing a zero-length residual error between the plurality of first carrier phase differences $\Delta_1$ and the plurality of third carrier phase differences $\Delta_3$. System 390 will determine whether false GNSS satellite signals are present based on the results of these computations. Receiver 321 of system 390 determines that false GNSS satellite signals are being received by system 390 when the residual error between the first and second carrier phase differences $\Delta_1$ and $\Delta_2$ is greater than a predetermined threshold residual error value, and the zero-length baseline residual error between the first and third carrier phase differences $\Delta_1$ and $\Delta_3$ is less than the predetermined threshold residual error value. The computation of the zero-length baseline solution, the resulting third carrier phase differences $\Delta_3$, and the zero-length residual error is used in this embodiment to confirm the determination that false GNSS satellite signals are present.

Thus when an attitude determining system such as system 390 is being spoofed with false GNSS satellite signals, the residual error between the first measured and second estimated carrier phase differences $\Delta_1$ and $\Delta_2$ will be large. When the residual error is greater than a threshold residual error value it will be used as an indication of false GNSS satellite signals. When an attitude determining system such as system 390 is being spoofed with false GNSS satellite signals, the zero-length residual error between the first measured and third estimated carrier phase differences $\Delta_1$ and $\Delta_3$ will be small. When both the residual error is greater than a threshold residual error value AND the zero-length residual error is less than the threshold residual error value, it will be used as an indication of false GNSS satellite signals.

Described herein is a number of systems and methods for determining the presence of false GNSS satellite systems. The system according to some embodiments of the invention uses at least two antennas to receive a plurality of GNSS satellite signals from a plurality of GNSS satellites. Measurements of GNSS satellite code or carrier phase $\varphi$ of the GNSS satellite signals are made. The GNSS satellite code or carrier phase $\varphi$ measurements are used in a number of computations to detect the presence of false GNSS satellite signals. Various embodiments of the method of detecting GNSS satellite systems include computations of the range to the GNSS satellites, the GNSS locations of the antennas, the attitude of baseline vectors between pairs of antennas, and first measured and second estimated carrier phase differences for the GNSS satellite signals at pairs of antennas. These measurements and computations are used to detect the presence of false GNSS satellite signals so that the vehicle or device that is using the system does not become misdirected from the false GNSS satellite signals, or provide incorrect time data. It is to be understood that the systems, methods, computations, and elements described herein can be used in many different forms according to embodiments of the invention, and is not limited to the examples described in this document. Many variations will be apparent to those skilled in the art based upon the examples and descriptions in this document.

Figure 17:
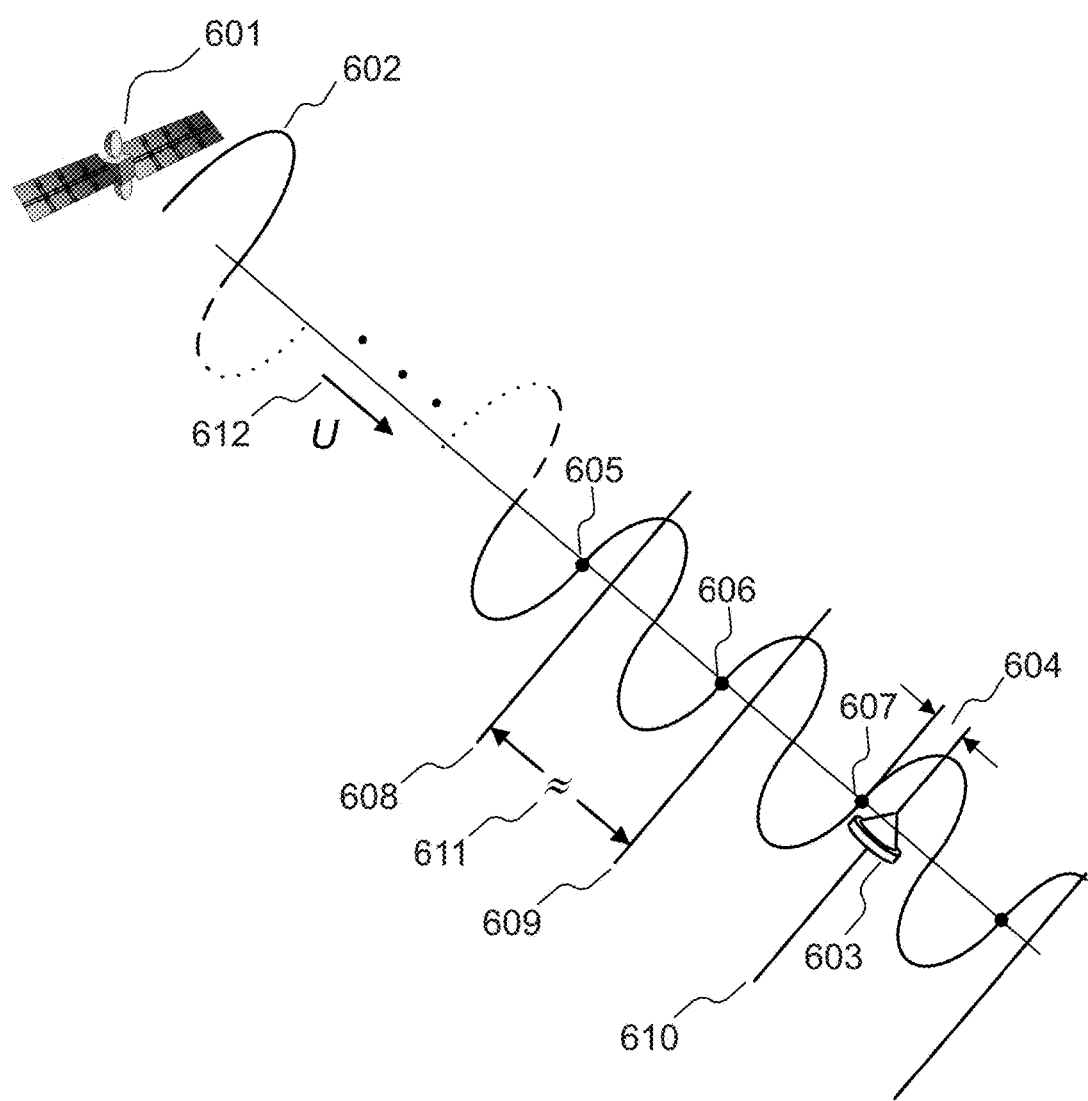
FIG. 17 generally depicts a carrier signal broadcast from a satellite to an antenna along a path in the direction of a unit vector.

FIG. 17 depicts a carrier signal 602 which is broadcast from satellite 601 to antenna 603 along a path in the direction of unit vector 612. The carrier signal is sinusoidal and repeats at points 605, 606 and 607 which represent cycles of the carrier. There is large number of integer cycles between the satellite 601 and antenna 603. The wavelength of the carrier signal, 611, is the distance of one cycle of the carrier, which is also the distance between any two repeating points 605 and 606. The wavelength, λ, is about 19 centimeters for the GPS L1 signal, and is in the range of approximately ⅕th to ¼th of a meter for most GNSS signals. The GNSS attitude system measures fractional wavelengths 604, usually to within an accuracy of well less than a centimeter and often down to the millimeter level. The carrier signal is a used as a measure of range between antenna and satellite by multiplying cycles of the carrier by the wavelength to obtain a range in meters. A carrier phase range measurement is preferable over code phase measurements due to high precision. Part of the attitude solution involves solving the number of integer carrier cycles that result when carrier phases are differences between antennas. This integer number is often referred to as an integer ambiguity because carrier tracking starts at an arbitrary integer of the carrier phase. Integer ambiguity solutions are well known in the art, and are often quite mathematically intensive. If antennas are spaced very closely, on the order of ½ of a carrier wavelength, the solution of the integers can be simplified since integers are easily chosen to assure differences of less than one cycle. Short antenna baselines avoid complex ambiguity searches which may be beneficial for reliable detection of spoofing. Carrier phase measurements, even on a ½ cycle baseline still provide enough accuracy that the problem introduced by inaccurate measurements as shown in FIG. 3 are avoided.

Figure 18:
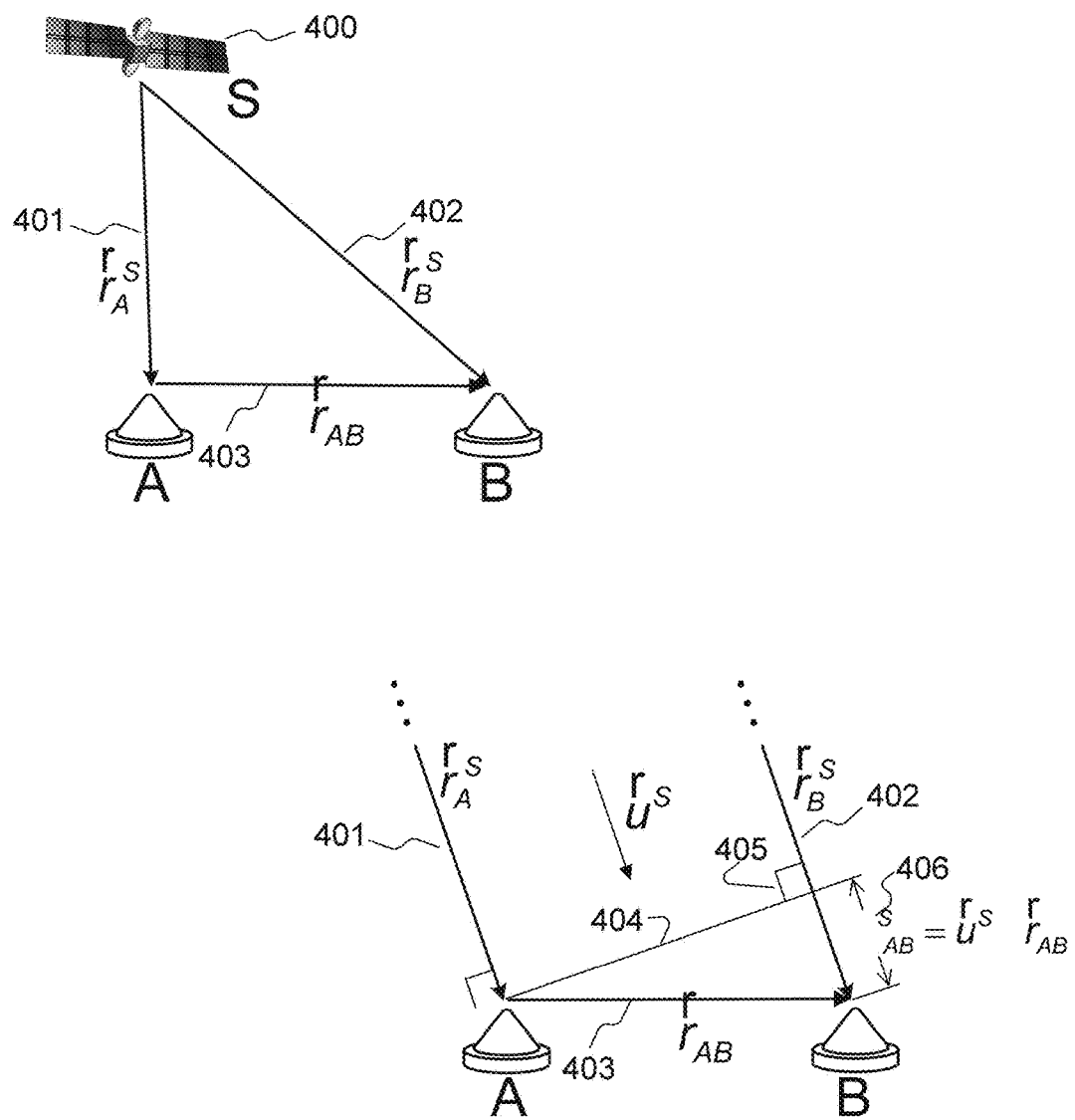
FIG. 18 generally depicts a system for use in spoofing detection.

In FIG. 18, antennas A and B are shown separated by a baseline vector $\vec{r}_{AB}$ referenced as 403. Signals 401 and 402 arrive at antennas A and B from satellite 400 along paths $\vec{r}_A^S$ and $\vec{r}_B^S$ respectively. The geometry is not shown to scale since the satellite, 400, located at S is a very far distance (thousands of kilometers away in earth orbit) as compared to the distance between A and B, which may be several centimeters to a few tens of meters apart.

FIG. 18 provides a better depiction of the geometry, and since the satellite S is far away, it is not shown. Essentially, for practical and computational purposes, the vectors $\vec{r}_A^S$ and $\vec{r}_A^B$ originating from the satellite and ending at antennas A and B are parallel. A unit vector from the satellite, $\vec{u}^S$, is shown and is parallel to both $\vec{r}_A^S$ and $\vec{r}_B^S$. An attitude system uses differential measurements of carrier phase. The difference of signal transmission path from satellite S to the two antennas A and B is the difference in length between the vectors $\vec{r}_A^S$ and $\vec{r}_B^S$. This distance, $\Delta_{AB}^S$, can be shown to be $\Delta_{AB}^S = \vec{u}^S \cdot \vec{r}_{AB}$, 403, is the baseline vector. In multiple antenna attitude systems, there are multiple baseline vectors. The attitude system makes measurements of $\Delta_{AB}^S$ by differencing carrier phase observations measured at antennas A and B. It then solves for the vector $\vec{r}_{AB}$ using multiple measurements of differential carrier phase from multiple satellites, possibly solving for carrier phase integer ambiguities as well.

Figure 19:
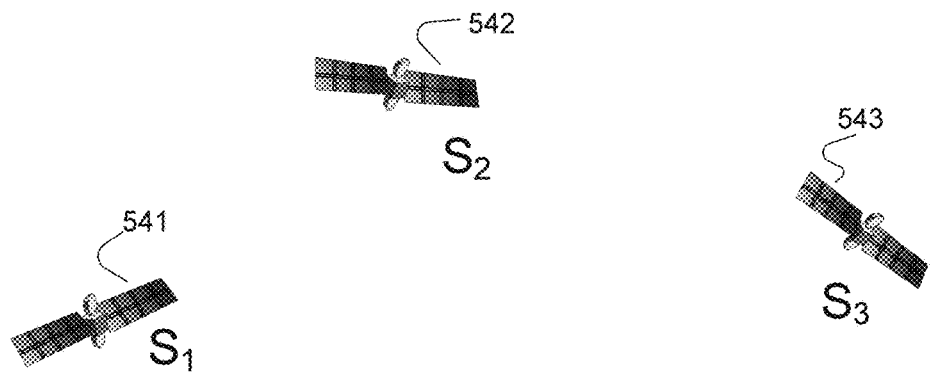
FIG. 19 generally depicts a two-antenna system where multiple carrier phase measurements are made from signals arriving from satellites.
Figure 19:
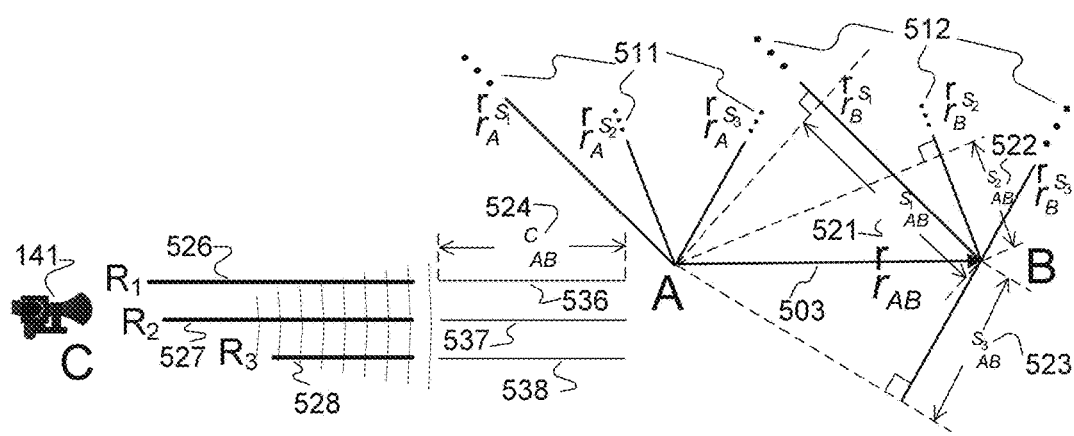

FIG. 19 shows a two antenna attitude system where multiple carrier phase measurements are made from signals arriving from satellites 541, 542, and 543. The signals originate at the satellites and arrive at antenna A along paths, 511. The range vectors $\vec{r}_A^{S1}$, $\vec{r}_A^{S2}$ and $\vec{r}_A^{S3}$ are shown along these paths. Similarly, signals 512, originating at satellites 541, 542, and 543 arrive at antenna B taking three paths essentially parallel to the three paths, 511, taken for signals arriving at antenna A. The vectors from satellites to antenna B are denoted $\vec{r}_B^{S1}$, $\vec{r}_B^{S2}$ and $\vec{r}_B^{S3}$. A baseline vector, 503, between antenna A and B is shown, and is denoted $\vec{r}_{AB}$. The signal path length differences between antennas A and B depend on the angle that the signal's path makes with $\vec{r}_{AB}$. Satellites are typically at different points in the sky, and thus make different angles. The differential path lengths' $\Delta_{AB}^{S1}$, $\Delta_{AB}^{S2}$ and $\Delta_{AB}^{S3}$ shown as 521, 522 and 523, respectively, all have different values. In the attitude system, these values are measure by differencing carrier phase measurements taken at antenna A and antenna B. Once the differential carrier phase measurements are made, the vector $\vec{r}_{AB}$ is solved using algebraic least-squares methods or a Kalman filter. Once $\vec{r}_{AB}$ is solved, the measured differential carrier phase will agree with the geometric values of $\Delta_{AB}^{S1}$, $\Delta_{AB}^{S2}$ and $\Delta_{AB}^{S3}$ to the accuracy of the carrier phase measurements, which is typically below one centimeter.

Now consider what happens if the attitude system is spoofed. The spoofing signals 526, 527, and 528 all arrive from a common point C, located at the transmitter 141. These spoofing signals are generated to appear to have path lengths, R1 R2 and R3 plus a common transmission path length. The attitude system measures the carrier phase of each of these signals at antennas A and B, and differences the measured carrier phase. The ranges R1 R2 and R3 cancel in the differences. Consequently, each carrier phase difference, 536, 537 and 538, should have the same value, $\Delta_{AB}^C$, which is the common path length difference between antenna A and antenna B as traversed by the spoofing signals. So, when spoofed, all differential carrier phase measurement exhibit a common value, $\Delta_{AB}^C$, rather than unique values $\Delta_{AB}^{S1}$, $\Delta_{AB}^{S2}$ and $\Delta_{AB}^{S3}$. This will be easily detectable. One way to detect this is the agreement of the measured differential carrier phase with the estimated geometric values $\Delta_{AB}^{S1}$, $\Delta_{AB}^{S2}$ and $\Delta_{AB}^{S3}$, these differences often called residual errors. During spoofing, residual errors will be larger than normal. Typically, in an attitude system, you know the length of the baseline vector $\vec{r}_{AB}$ in advance and there would likely be no solution for the orientation of $\vec{r}_{AB}$ that would result in small residual errors. That is, the attitude solution would be a poor fit to the data. As a confirmation, if spoofing is suspected due to poor fit of the data, the software could re-compute the attitude solution with the assumption that the baseline vector length was zero. If residual errors become small with the zero-baseline assumption, this is yet another confirmation that you are being spoofed.

The embodiments and examples set forth herein were presented in order to best explain embodiments of the invention and its practical application and to thereby enable those of ordinary skill in the art to make and use embodiments of the invention. However, those of ordinary skill in the art will recognize that the foregoing description and examples have been presented for the purposes of illustration and example only. The description as set forth is not intended to be exhaustive or to limit embodiment of the invention to the precise form disclosed. Many modifications and variations are possible in light of the teachings above without departing from the spirit and scope of the forthcoming claims.

The invention claimed is:

1. A method of using a global navigation satellite system (GNSS) attitude determining system to detect false GNSS satellite signals, the method comprising:
receiving a plurality of GNSS satellite signals with each one of a plurality of antennas, wherein each one of the plurality of antennas belongs to the GNSS attitude determining system;

measuring a plurality of GNSS satellite signal phase values, wherein the plurality of GNSS satellite signal phase values comprises a GNSS satellite signal phase value for each of the plurality of GNSS satellite signals at each of the plurality of antennas;

using the plurality of GNSS satellite signal phase values to compute an attitude of the attitude determining system wherein computing an attitude of the attitude determining system includes solving the number of integer carrier cycles that result when carrier phases are differenced between antennas to determine integer ambiguities;

and using the plurality of GNSS satellite signal phase values to determine whether the plurality of GNSS satellite signals includes a false GNSS satellite signal, wherein using the plurality of GNSS satellite signal phase values to determine whether the plurality of GNSS satellite signals includes a false GNSS satellite signal includes:

computing a plurality of first measured carrier phase differences from the measured plurality of GNSS satellite signal phase values;

computing an estimated attitude of a baseline vector, wherein the baseline vector extends between a first one of the plurality of antennas and a second one of the plurality of antennas, and wherein the estimated attitude of the baseline vector is determined by simultaneously solving a set of multiple equations, each equation in the set of multiple equations equating a first measured carrier phase difference for a different GNSS satellite signal to the dot product of the estimated attitude of the baseline vector and a unit vector associated with that GNSS satellite signal;

computing a plurality of second estimated carrier phase differences using the computed attitude of the baseline vector;

comparing the plurality of first measured carrier phase differences to the plurality of second estimated carrier phase differences;

and, using the comparison of the plurality of first measured carrier phase differences to the plurality of second estimated carrier phase differences to determine whether the plurality of GNSS satellite signals includes a false GNSS satellite signal.

2. The method of claim 1, further comprising computing an attitude of a second baseline vector, wherein the second baseline vector extends between the first one of the plurality of antennas and a third one of the plurality of antennas.

3. The method of claim 1, wherein computing a plurality of first measured carrier phase differences comprises subtracting a first measured carrier phase value of each individual one of the plurality of satellite signals as received at the first one of the plurality of antennas from a corresponding second measured carrier phase value of each individual one of the plurality of satellite signals as received at the second one of the plurality of antennas.

4. The method of claim 1, wherein comparing the plurality of first measured carrier phase differences to the plurality of second estimated carrier phase differences comprises subtracting the first measured carrier phase difference for each one of the plurality of GNSS satellite signals from the second estimated carrier phase difference for the corresponding same one of the plurality of GNSS satellite signals.

5. A system for detecting false global navigation satellite system (GNSS) satellite signals, the system comprising:

a first antenna, wherein the first antenna receives a plurality of GNSS satellite signals, wherein each one of the plurality of GNSS satellite signals is broadcast by a corresponding one of a plurality of GNSS satellites;

a second antenna, wherein the second antenna receives the plurality of GNSS satellite signals;

and a receiver electrically connected to each of the first antenna and the second antenna, wherein the receiver receives the plurality of satellite signals received by each of the first and the second antenna, and wherein the receiver executes:

measuring a plurality of carrier phase values, wherein the plurality of carrier phase values comprises a carrier phase value for each of the plurality of satellite signals at each of the first and the second antenna;

using the plurality of carrier phase values to compute an attitude of the system;

solving the number of integer carrier cycles that result when carrier phases are differenced between antennas to determine integer ambiguities;

performing a computation using the plurality of carrier phase values wherein performing a computation using the plurality of carrier phase values comprises:

computing a plurality of first measured carrier phase differences using the plurality of carrier phase values, wherein each of the plurality of first measured carrier phase differences is the difference between a measured carrier phase value of a specific one of the plurality of GNSS satellite signals at the first antenna and a measured carrier phase value of the specific one of the plurality of GNSS satellite signals at the second antenna;

computing an attitude of a baseline vector using the plurality of first measured carrier phase differences, wherein the baseline vector extends between the first antenna and the second antenna;

computing a plurality of second estimated carrier phase differences using the computed attitude of the baseline vector;

comparing the plurality of first measured carrier phase differences to the plurality of second estimated carrier phase differences and determining whether any of the plurality of GNSS satellite signals are false GNSS satellite signals based on the results of the comparison.

6. The system of claim 5, wherein computing an attitude of a baseline vector using the plurality of first measured carrier phase differences is performed using a predetermined value for a length of the baseline vector.

7. The system of claim 5, wherein computing a plurality of second estimated carrier phase differences using the attitude of the baseline vector comprises computing the dot product of the baseline vector and each one of a plurality of unit vectors, wherein each of the plurality of unit vectors corresponds to one of the plurality of GNSS satellites.

8. The system of claim 5, wherein:

comparing the plurality of first measured carrier phase differences to the plurality of second estimated carrier phase differences comprises computing a residual error between the plurality of first measured carrier phase differences and the plurality of second estimated carrier phase differences; and determining whether any of the plurality of GNSS satellite signals are false GNSS satellite signals based on the results of the comparison comprises determining that the plurality of GNSS satellite signals includes a false GNSS satellite signal in response to the residual error value being greater than a threshold residual error value.

9. The system of claim 5, wherein the receiver further executes preventing the system from outputting a positional output in response to determining that the plurality of GNSS satellite signals includes a false GNSS satellite signals.

* * * * *